INVENTOR
FLOYD D. RAASCH

BY George H Fisher

ATTORNEY

Aug. 23, 1960 F. D. RAASCH 2,950,469

ANALOGUE TO DIGITAL CONVERSION APPARATUS

Filed April 14, 1954

16 Sheets-Sheet 2

INVENTOR

FLOYD D. RAASCH

BY George H Fisher

ATTORNEY

INVENTOR
FLOYD D. RAASCH
BY George H Fisher
ATTORNEY

ANALOGUE TO DIGITAL CONVERSION APPARATUS

Filed April 14, 1954

FLOYD D. RAASCH
INVENTOR

BY George H Fisher
ATTORNEY

Aug. 23, 1960 F. D. RAASCH 2,950,469

ANALOGUE TO DIGITAL CONVERSION APPARATUS

Filed April 14, 1954 16 Sheets-Sheet 5

INVENTOR
FLOYD D. RAASCH

BY George H Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 6

INVENTOR
FLOYD D. RAASCH

BY George H Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 7

INVENTOR

FLOYD D. RAASCH

BY George H. Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 8

INVENTOR
FLOYD D. RAASCH

BY George H Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 9

INVENTOR
FLOYD D. RAASCH

BY George H Fisher

ATTORNEY

FLOYD D. RAASCH INVENTOR

BY George H Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 11

INVENTOR

FLOYD D. RAASCH

BY George H Fisher

ATTORNEY

Aug. 23, 1960 F. D. RAASCH 2,950,469

ANALOGUE TO DIGITAL CONVERSION APPARATUS

Filed April 14, 1954 16 Sheets-Sheet 12

| VOLTAGE AT 240 | VOLTAGE AT 236 | VOLTAGE DROP IN 245 | VOLTAGE AT 242 | VOLTAGE AT 256 | VOLTAGE DROP IN 276 | VOLTAGE AT 274 | VOLTAGE AT 284 | VOLTAGE DROP IN 292 | VOLTAGE AT 290 | VOLTAGE AT 297 | VOLTAGE DROP IN 305 | VOLTAGE AT 303 |
|---|---|---|---|---|---|---|---|---|---|---|---|---|
| 1 | 0 | 1/2 | −1/2 | 1 | 2/3 | +1/3 | 1/2 | 3/10 | +1/5 | +1/4 | 5/36 | +1/9 |
| 1 | 1/8 | 9/16 | −7/16 | 7/8 | 5/8 | +1/4 | 3/8 | 11/40 | +1/10 | +5/40 | 5/40 | (−) 0 |
| 1 | 1/4 | 5/8 | −3/8 | 3/4 | 7/12 | +1/6 | 1/4 | 1/4 | (−) 0 | 0 | 1/9 | −1/9 |
| 1 | 3/8 | 11/16 | −5/16 | 5/8 | 13/24 | +1/12 | 1/8 | 9/40 | −1/10 | +5/40 | 5/40 | (+) 0 |
| 1 | 1/2 | 3/4 | −1/4 | 1/2 | 1/2 | (−) 0 | 0 | 1/5 | −1/5 | +1/4 | 5/36 | +1/9 |
| 1 | 5/8 | 13/16 | −3/16 | 3/8 | 11/24 | −1/12 | 1/8 | 9/40 | −1/10 | +5/40 | 5/40 | (−) 0 |
| 1 | 3/4 | 7/8 | −1/8 | 1/4 | 5/12 | −1/6 | 1/4 | 1/4 | (+) 0 | 0 | 1/9 | −1/9 |
| 1 | 7/8 | 15/16 | −1/16 | 1/8 | 3/8 | −1/4 | 3/8 | 11/40 | +1/10 | +5/40 | 5/40 | (+) 0 |
| 1 | 1 | 1 | (+) 0 | 0 | 1/3 | −1/3 | 1/2 | 3/10 | +1/5 | +1/4 | 5/36 | +1/9 |
| 1 | 1 1/8 | 1 1/16 | +1/16 | 1/8 | 3/8 | −1/4 | 3/8 | 11/40 | +1/10 | +5/40 | 5/40 | (−) 0 |
| 1 | 1 1/4 | 1 1/8 | +1/8 | 1/4 | 5/12 | −1/6 | 1/4 | 1/4 | (−) 0 | 0 | 1/9 | −1/9 |
| 1 | 1 3/8 | 1 3/16 | +3/16 | 3/8 | 11/24 | −1/12 | 1/8 | 9/40 | −1/10 | +5/40 | 5/40 | (+) 0 |
| 1 | 1 1/2 | 1 1/4 | +1/4 | 1/2 | 1/2 | (+) 0 | 0 | 1/5 | −1/5 | +1/4 | 5/36 | +1/9 |
| 1 | 1 5/8 | 1 5/16 | +5/16 | 5/8 | 13/24 | +1/12 | 1/8 | 9/40 | −1/10 | +5/40 | 5/40 | (−) 0 |
| 1 | 1 3/4 | 1 3/8 | +3/8 | 3/4 | 7/12 | +1/6 | 1/4 | 1/4 | (+) 0 | 0 | 1/9 | −1/9 |
| 1 | 1 7/8 | 1 7/16 | +7/16 | 7/8 | 5/8 | +1/4 | 3/8 | 11/40 | +1/10 | +5/40 | 5/40 | (+) 0 |

FIG. 16

INVENTOR
FLOYD D. RAASCH

BY George H Fisher

ATTORNEY

| VOLTAGE AT 240 | VOLTAGE AT 236 | VOLTAGE DROP IN 245 | VOLTAGE AT 242 | VOLTAGE AT 256 | VOLTAGE DROP IN 323 | VOLTAGE AT 274 | VOLTAGE AT 284 | VOLTAGE DROP IN 324 | VOLTAGE AT 290 | VOLTAGE AT 297 | VOLTAGE DROP IN 325 | VOLTAGE AT 303 |
|---|---|---|---|---|---|---|---|---|---|---|---|---|
| −1 | + 0 | 1/2 | − 1/2 | + 1/2 | 3/10 | + 1/5 | + 1/5 | 6/55 | + 1/11 | + 1/11 | 12/253 | + 1/23 |
| −1 | + 1/8 | 9/16 | − 7/16 | + 7/16 | 23/80 | + 3/20 | + 3/20 | 23/220 | + 1/22 | + 1/22 | 1/22 | (−) 0 |
| −1 | + 1/4 | 5/8 | − 3/8 | + 3/8 | 11/40 | + 1/10 | + 1/10 | 1/10 | (−) 0 | 0 | 1/23 | − 1/23 |
| −1 | + 3/8 | 11/16 | − 5/16 | + 5/16 | 21/80 | + 1/20 | + 1/20 | 21/220 | − 1/22 | + 1/22 | 1/22 | (+) 0 |
| −1 | + 1/2 | 3/4 | − 1/4 | + 1/4 | 1/4 | (−) 0 | 0 | 1/11 | − 1/11 | + 1/11 | 12/253 | + 1/23 |
| −1 | + 5/8 | 13/16 | − 3/16 | + 3/16 | 19/80 | − 1/20 | + 1/20 | 21/220 | − 1/22 | + 1/22 | 1/22 | (−) 0 |
| −1 | + 3/4 | 7/8 | − 1/8 | + 1/8 | 9/40 | − 1/10 | + 1/10 | 1/10 | (+) 0 | 0 | 1/23 | − 1/23 |
| −1 | + 7/8 | 15/16 | − 1/16 | + 1/16 | 17/80 | − 3/20 | + 3/20 | 23/220 | + 1/22 | + 1/22 | 1/22 | (+) 0 |
| −1 | + 1 | 1 | (+) 0 | 0 | 1/5 | − 1/5 | + 1/5 | 6/55 | + 1/11 | + 1/11 | 12/253 | + 1/23 |
| −1 | + 1 1/8 | 1 1/16 | + 1/16 | + 1/16 | 17/80 | − 3/20 | + 3/20 | 23/220 | + 1/22 | + 1/22 | 1/22 | (−) 0 |
| −1 | + 1 1/4 | 1 1/8 | + 1/8 | + 1/8 | 9/40 | − 1/10 | + 1/10 | 1/10 | (−) 0 | 0 | 1/23 | − 1/23 |
| −1 | + 1 3/8 | 1 3/16 | + 3/16 | + 3/16 | 19/80 | − 1/20 | + 1/20 | 21/220 | − 1/22 | + 1/22 | 1/22 | (+) 0 |
| −1 | + 1 1/2 | 1 1/4 | + 1/4 | + 1/4 | 1/4 | (+) 0 | 0 | 1/11 | − 1/11 | + 1/11 | 12/253 | + 1/23 |
| −1 | + 1 5/8 | 1 5/16 | + 5/16 | + 5/16 | 21/80 | + 1/20 | + 1/20 | 21/220 | − 1/22 | + 1/22 | 1/22 | (−) 0 |
| −1 | + 1 3/4 | 1 3/8 | + 3/8 | + 3/8 | 11/40 | + 1/10 | + 1/10 | 1/10 | (+) 0 | 0 | 1/23 | − 1/23 |
| −1 | + 1 7/8 | 1 7/16 | + 7/16 | + 7/16 | 23/80 | + 3/20 | + 3/20 | 23/220 | + 1/22 | + 1/22 | 1/22 | (+) 0 |

FIG. 17

INVENTOR
FLOYD D. RAASCH
BY George H Fisher
ATTORNEY

Aug. 23, 1960 F. D. RAASCH 2,950,469

ANALOGUE TO DIGITAL CONVERSION APPARATUS

Filed April 14, 1954 16 Sheets-Sheet 14

| VOLTAGE AT 334 | VOLTAGE AT 333 | VOLTAGE AT 337 | VOLTAGE FROM 342 | VOLTAGE AT 353 | VOLTAGE FROM 357 | VOLTAGE AT 370 | VOLTAGE FROM 375 |
|---|---|---|---|---|---|---|---|
| − 1 | 0 | − 1/2 | − 1 | − 1/8 | − 1/2 | − 1/16 | − 1/2 |
| − 1 | + 1/8 | − 7/16 | − 7/8 | − 3/32 | − 3/8 | − 1/32 | − 1/4 |
| − 1 | + 1/4 | − 3/8 | − 3/4 | − 1/16 | − 1/4 | (+) 0 | (+) 0 |
| − 1 | + 3/8 | − 5/16 | − 5/8 | − 1/32 | − 1/8 | + 1/32 | + 1/4 |
| − 1 | + 1/2 | − 1/4 | − 1/2 | (+) 0 | (+) 0 | − 1/16 | − 1/2 |
| − 1 | + 5/8 | − 3/16 | − 3/8 | + 1/32 | + 1/8 | − 1/32 | − 1/4 |
| − 1 | + 3/4 | − 1/8 | − 1/4 | + 1/16 | + 1/4 | (+) 0 | (+) 0 |
| − 1 | + 7/8 | − 1/16 | − 1/8 | + 3/32 | + 3/8 | + 1/32 | + 1/4 |
| − 1 | + 1 | (+) 0 | (+) 0 | − 1/8 | − 1/2 | − 1/16 | − 1/2 |
| − 1 | + 1 1/8 | + 1/16 | + 1/8 | − 3/32 | − 3/8 | − 1/32 | − 1/4 |
| − 1 | + 1 1/4 | + 1/8 | + 1/4 | − 1/16 | − 1/4 | (+) 0 | (+) 0 |
| − 1 | + 1 3/8 | + 3/16 | + 3/8 | − 1/32 | − 1/8 | + 1/32 | + 1/4 |
| − 1 | + 1 1/2 | + 1/4 | + 1/2 | (+) 0 | (+) 0 | − 1/16 | − 1/2 |
| − 1 | + 1 5/8 | + 5/16 | + 5/8 | + 1/32 | + 1/8 | − 1/32 | − 1/4 |
| − 1 | + 1 3/4 | + 3/8 | + 3/4 | + 1/16 | + 1/4 | (+) 0 | (+) 0 |
| − 1 | + 1 7/8 | + 7/16 | + 7/8 | + 3/32 | + 3/8 | + 1/32 | + 1/4 |

FIG. 18

INVENTOR
FLOYD D. RAASCH

BY George H Fisher

ATTORNEY

Aug. 23, 1960 F. D. RAASCH 2,950,469
ANALOGUE TO DIGITAL CONVERSION APPARATUS
Filed April 14, 1954 16 Sheets-Sheet 15

| "STD" | "SIGNAL" | ACROSS BRIDGE 455 (OUT 1) | CATH FOLWR 510 | SOURCE 466 | ACROSS BRIDGE 473 (OUT 2) | CATH FOLWR 511 | SOURCE 484 | ACROSS BRIDGE 491 (OUT 3) | CATH FOLWR 512 | SOURCE 502 | ACROSS 504 (OUT 4) |
|---|---|---|---|---|---|---|---|---|---|---|---|
| -1 | 0 | -1 | 1 | -1/2 | 1/2 | 1/2 | -1/4 | 1/4 | 1/4 | -1/8 | 1/8 |
| -1 | 1/8 | -7/8 | 7/8 | -1/2 | 3/8 | 3/8 | -1/4 | 1/8 | 1/8 | -1/8 | 0 |
| -1 | 1/4 | -3/4 | 3/4 | -1/2 | 1/4 | 1/4 | -1/4 | 0 | 0 | -1/8 | -1/8 |
| -1 | 3/8 | -5/8 | 5/8 | -1/2 | 1/8 | 1/8 | -1/4 | -1/8 | 1/8 | -1/8 | 0 |
| -1 | 1/2 | -1/2 | 1/2 | -1/2 | 0 | 0 | -1/4 | -1/4 | 1/4 | -1/8 | 1/8 |
| -1 | 5/8 | -3/8 | 3/8 | -1/2 | -1/8 | 1/8 | -1/4 | -1/8 | 1/8 | -1/8 | 0 |
| -1 | 3/4 | -1/4 | 1/4 | -1/2 | -1/4 | 1/4 | -1/4 | 0 | 0 | -1/8 | -1/8 |
| -1 | 7/8 | -1/8 | 1/8 | -1/2 | -3/8 | 3/8 | -1/4 | 1/8 | 1/8 | -1/8 | 0 |
| -1 | 1 | 0 | 0 | -1/2 | -1/2 | 1/2 | -1/4 | 1/4 | 1/4 | -1/8 | 1/8 |
| -1 | 1 1/8 | 1/8 | 1/8 | -1/2 | -3/8 | 3/8 | -1/4 | 1/8 | 1/8 | -1/8 | 0 |
| -1 | 1 1/4 | 1/4 | 1/4 | -1/2 | -1/4 | 1/4 | -1/4 | 0 | 0 | -1/8 | -1/8 |
| -1 | 1 3/8 | 3/8 | 3/8 | -1/2 | -1/8 | 1/8 | -1/4 | -1/8 | 1/8 | -1/8 | 0 |
| -1 | 1 1/2 | 1/2 | 1/2 | -1/2 | 0 | 0 | -1/4 | -1/4 | 1/4 | -1/8 | 1/8 |
| -1 | 1 5/8 | 5/8 | 5/8 | -1/2 | 1/8 | 1/8 | -1/4 | -1/8 | 1/8 | -1/8 | 0 |
| -1 | 1 3/4 | 3/4 | 3/4 | -1/2 | 1/4 | 1/4 | -1/4 | 0 | 0 | -1/8 | -1/8 |
| -1 | 1 7/8 | 7/8 | 7/8 | -1/2 | 3/8 | 3/8 | -1/4 | 1/8 | 1/8 | -1/8 | 0 |

Fig. 19

Aug. 23, 1960 F. D. RAASCH 2,950,469

ANALOGUE TO DIGITAL CONVERSION APPARATUS

Filed April 14, 1954 16 Sheets-Sheet 16

INVENTOR.
FLOYD D. RAASCH

BY George H. Fisher

ATTORNEY

United States Patent Office 2,950,469
Patented Aug. 23, 1960

2,950,469

ANALOGUE TO DIGITAL CONVERSION APPARATUS

Floyd Daniel Raasch, St. Louis Park, Minn., assignor to Minneapolis-Honeywell Regulator Company, Minneapolis, Minn., a corporation of Delaware Filed Apr. 14, 1954, Ser. No. 423,049

4 Claims. (Cl. 340—347)

This invention relates to the field of computers, and particularly to computing devices for giving a digital output when energized with an analogue input: such devices are referred to generally as quantizers.

There are two basic types of automatic computers which are generally recognized. One of these is the analogue type, in which parameters are in theory continuously variable: the other is the digital type in which parameters may have only discrete values. Each type of computer has advantages and disadvantages: one of the disadvantages of digital computers is the relative complexity of sensing elements. Analogue-output sensing devices are simple, reliable and inexpensive, and accordingly the present invention relates to means for converting analogue signals to a form usable in digital computation.

Every computer whether analogue or digital is based on a number system. In analogue computers it is convenient to use the ordinary decimal system, in which any number is a polynomial made up of the sum of a plurality of terms each of which is the product of a coefficient multiplied by a power of ten, ten being the radix of the decimal system. The Arabic numerals from zero to nine are the coefficients use, in their usual order of increasing magnitude. Thus 374 is an abbreviated way of expressing the polynomial $3\times10^2+7\times10^1+4\times10^0$.

The binary system of numbers is more convenient to use in high speed electronic computers since here only two coefficients are needed, namely zero and one, and these may be represented by the open and closed positions respectively of a simple switch. In the binary system the radix is two instead of ten. Thus the binary number 110010 is an abbreviated way of expressing the polynomial $1\times2^5+1\times2^4+0\times2^3+0\times2^2+1\times2^1+0\times2^0$.

The processes of digital computation are essentially those of counting. In either the binary system or the decimal system there are times in the course of counting when more than one figure in a number changes at the same time. Thus, between 199 and 200 in the decimal system and between 011 and 100 in the binary system, each of three figures changes. When more than one figure should in theory be changed at any signal level, there is always the possibility that due to manufacturing tolerances the different figures may change at slightly different signal levels. This could result in anomalous readings over a narrow range of signal voltage around the transition level, although over the whole range of the signals the readings should still be accurate. It has been found that by using the figures zero and one in a slightly different order than that customary in binary counting, it is possible to arrange a counting circuit so that there never need be change in more than one figure at a time: such an arrangement is called a progressive or reflected binary code. Counting in the simple binary system begins as follows: 0, 1, 10, 11, 100, 101, 110, 111, 1,000, etc.; in the progressive binary system it begins as follows: 0, 1, 11, 10, 110, 111, 101, 100, 1,100, etc.

The procedure described above was previously recognized and is known as the Gray code, but has been limited to numbers in the binary system. I have discovered that the same principle can be extended to systems having any radix. Thus the consecutive decimal numbers from zero to thirty, if expressed in the progressive decimal system, would read 0, 1, 2, 3, 4, 5, 6, 7, 8, 9, 19, 18, 17, 16, 15, 14, 13, 12, 11, 10, 20, 21, 22, 23, 24, 25, 26, 27, 28, 29, 39.

For larger numbers the conversion between simple and progressive decimal expressions may be explained as follows. The simple decimal number 374 is the same as the progressive decimal number 325. In converting from simple to progressive expressions copy the first figure of the simple decimal number without change. If the figure so copied is even, copy the second figure without change, but if the first-copied figure is odd, replace the second figure by its "nines complement," that is, by 9 minus the figure. Now if the sum of the figures copied is even, copy the next figure in the simple decimal number without change: if the sum is odd, replace the next figure in the simple decimal number by its nines complement to get the next figure in the progressive decimal number. Repeat the operation described in the last sentence as often as is necessary to complete the number, each time summing all the available figures in the progressive decimal number.

In converting from progressive to simple decimal numbers, copy the first figure of the progressive decimal number. If this figure is even, copy the second figure of the progressive decimal number unchanged, but if the first figure is odd, replace the second figure by its nines complement. If the sum of the first two figures in the progressive decimal number being converted is even, copy the third figure unchanged: if the sum is odd, replace the third figure by its nines complement. Repeat the operation described in the last sentence as often as necessary to complete the number, each time summing all the figures in the progressive decimal number which precede the figure under consideration to determine whether it or its nines complement is to be used.

For general numbers in a simple system having a radix R and written $$A_nR^n+A_{(n-1)}R^{(n-1)} \ldots +A_3R^3+A_2R^2+A_1R+A_0R^0$$

the progressive system equivalent may be written $$M_nR^n+M_{(n-1)}R^{(n-1)} \ldots +M_3R^3+M_2R^2+M_1R+M_0R^0$$

where M for any term is equal to A for that term, or to $(R-1)-A$, according as the sum of the preceding M's is even or odd. Similarly, for general numbers in a progressive system having a radix R and written $$A_nR^n+A_{(n-1)}R^{(n-1)} \ldots +A_3R^3+A_2R^2+A_1R+A_0R^0$$

the simple system equivalent may be written $$M_nR^n+M_{(n-1)}R^{(n-1)} \ldots +M_3R^3+M_2R^2+M_1R+M_0R^0$$

where M for any term is equal to A for that term, or to $(R-1)-A$, according as the sum of the preceding A's is even or odd.

From the foregoing it will be apparent that the number of objects represented by 374 in the simple decimal system is represented by the number 325 in the progressive decimal system, by the number 000101000101 in the simple binary system, and by the number 000111100111 in the progressive binary system. One other method of representation should also be described, in which the figures of a decimal number are individually expressed as their binary equivalents, which are then written together in the apparent form of a single binary number. According to this system the decimal number 325 would be expressed by the simple binary number 001100100101, the first four figures representing 3, the next four representing 2 and the last four figures representing 5. Similarly the same decimal number could be represented by the progressive binary number 001000110111, the first four, middle four, and last four numbers respectively representing 3, 2 and 5.

Automatic devices can be set up to use any of these forms of expressing numbers, or combinations of such forms. Moreover, some other starting figure than zero can be used in any counting system, since all counting consists merely of manipulating symbols arbitrarily assigned to represent quantities of arbitrarily selected magnitude.

The broad object of the invention is to provide improved, means for converting analogue data to digital form.

Another object of the invention is to provide a digital quantizer in which non-linear elements are used to obtain the desired quantization.

Another object of the invention is to provide such a quantizer in which the non-linear elements are switching devices.

Another object of the invention is to provide such a quantizer in which the non-linear elements are rectifiers.

Another object of the invention is to provide such a quantizer in which the non-linear elements include squaring and square root taking means.

Yet another object of the invention is to provide such a data converter in which an analogue signal voltage is compared with one or more standard voltages in one or more quantizer stages, the stage outputs giving the digital equivalent of the signal voltage.

A specific object of the invention is to provide such a data converter in which a plurality of quantizer stages are arranged to give digital outputs representing, in distinguishable binary outputs, the digits of a decimal number.

A further object of the invention is to provide digital computing apparatus especially adapted for use with progressively coded decimal numbers.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part heretof, and to the accompanying descriptive matter, in which I have illustrated and described certain preferred embodiments of my invention. In the drawings:

Figures 16, 17, 18, and 19 are tables showing voltage relations in certain embodiments of the invention.

Figure 1:
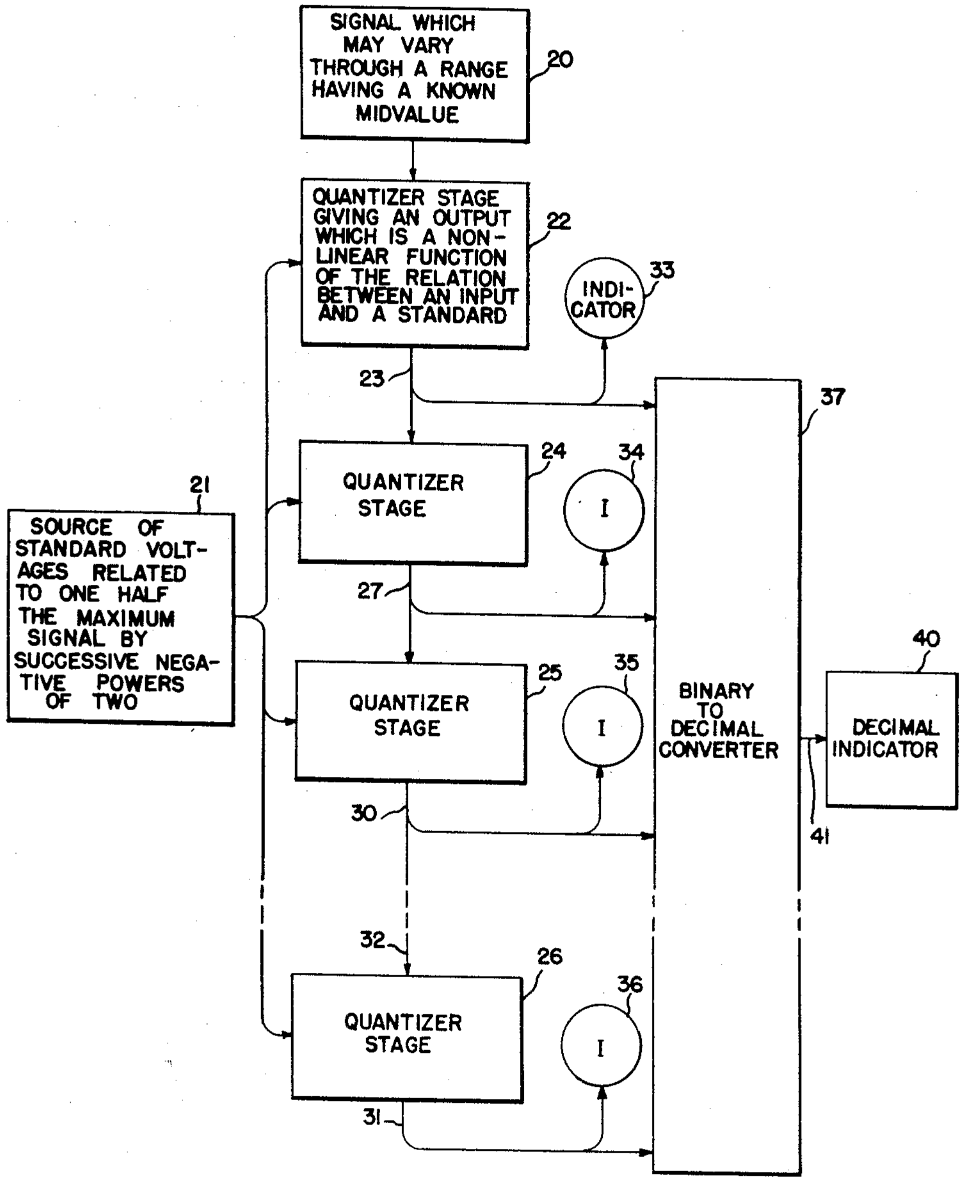
Figures 1 and 1A are block diagrams illustrative of typical analogue-to-digital converters or digital quantizers having decimal outputs.

In Figure 1 the analogue signal voltage which is to be converted to a digital response is shown at 20, and a source of standard voltages is shown at 21. The standard voltages are shown as having the magnitude relation of successive negative powers of two, the first and largest being equal in magnitude to half the anticipated maximum value of signal 20. The first quantizer stage 22 is energized from sources 20 and 21, and gives an output at 23 which depends on the relation between the inputs to the stage. Further similar quantizer stages 24, 25, and 26 are shown as energized from source 21: a second input to stage 24 is the output 23 of stage 22, and the output 27 from stage 23 is a second input to stage 25 having an output 30. As the figure indicates, this process may be repeated any desired number of times, according to the accuracy with which it is desired to express signal 20: the final stage 26 is shown as energized from source 21. The output of the last stage 26 is shown at 31, and like the other stages, it has a second input 32 derived from the output of a preceding stage.

In order to interpret the quantizer operation, indicators, 33, 34, 35, and 36 are energized with outputs 23, 27, 30, and 31. These indicators may be any devices having bivalent response: a typical example is a signal lamp which is lit to indicate one output and dark to indicate the other. By observing the indications, the operator is able to determine the binary equivalent of the signal voltage.

If desired, outputs 23, 27, 30, and 31 may also be supplied to a binary-to-decimal converter 37, which is arranged to operate a decimal indicator 40 through a suitable connection 41.

Figure 1A:
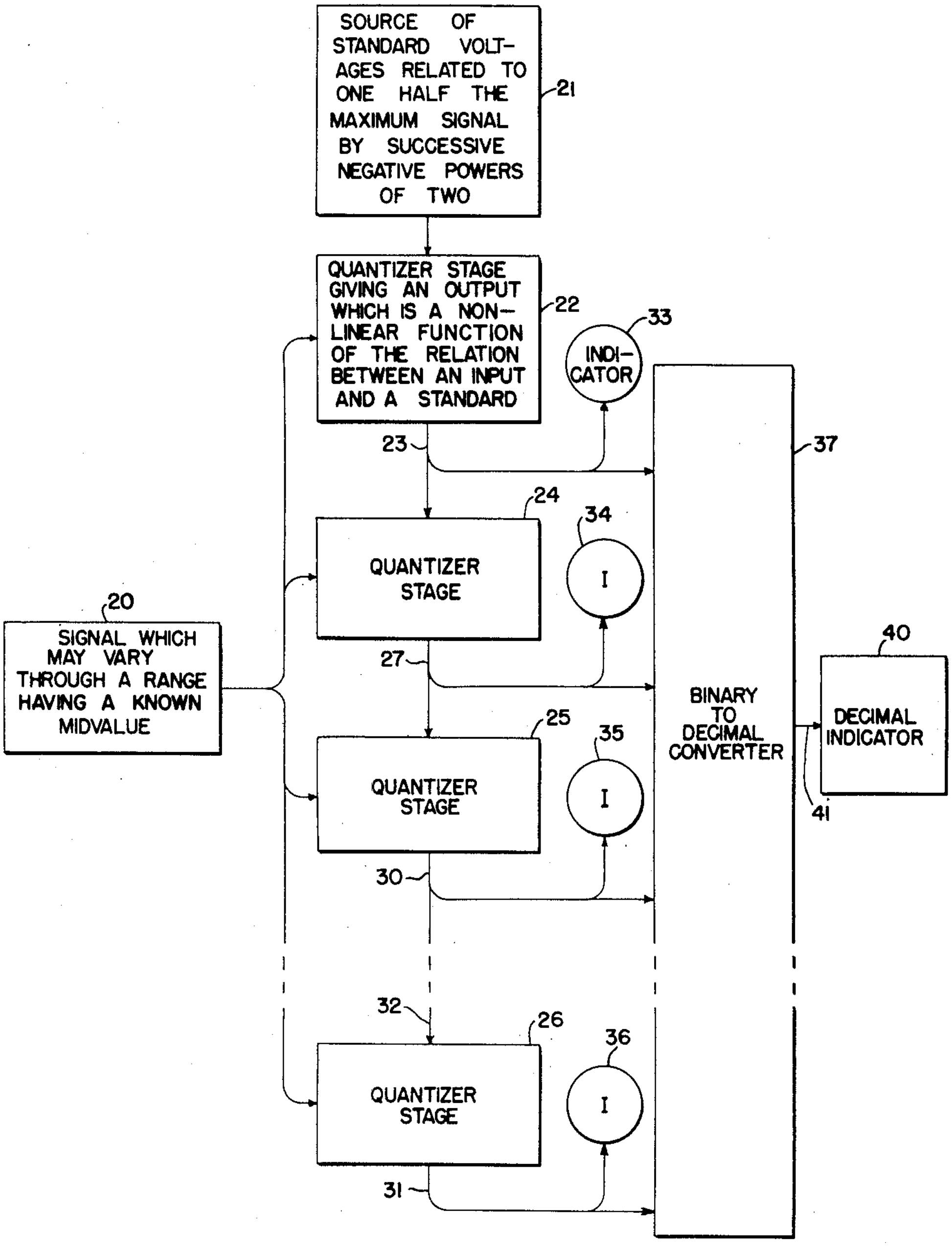

It should be pointed out that Figure 1 is illustrative of a specific converter, in which the signal is supplied directly only to the first quantizer stage. Figure 1A is presented to indicate that quantizers are also known in which the input arrangement is reversed from that shown, the signal being supplied directly to all stages and the standard being supplied directly to only the first stage. Other quantizers are discussed below which deviate from the block diagram in other specific respects: the general functioning of the quantizers remains the same throughout.

Figure 2:
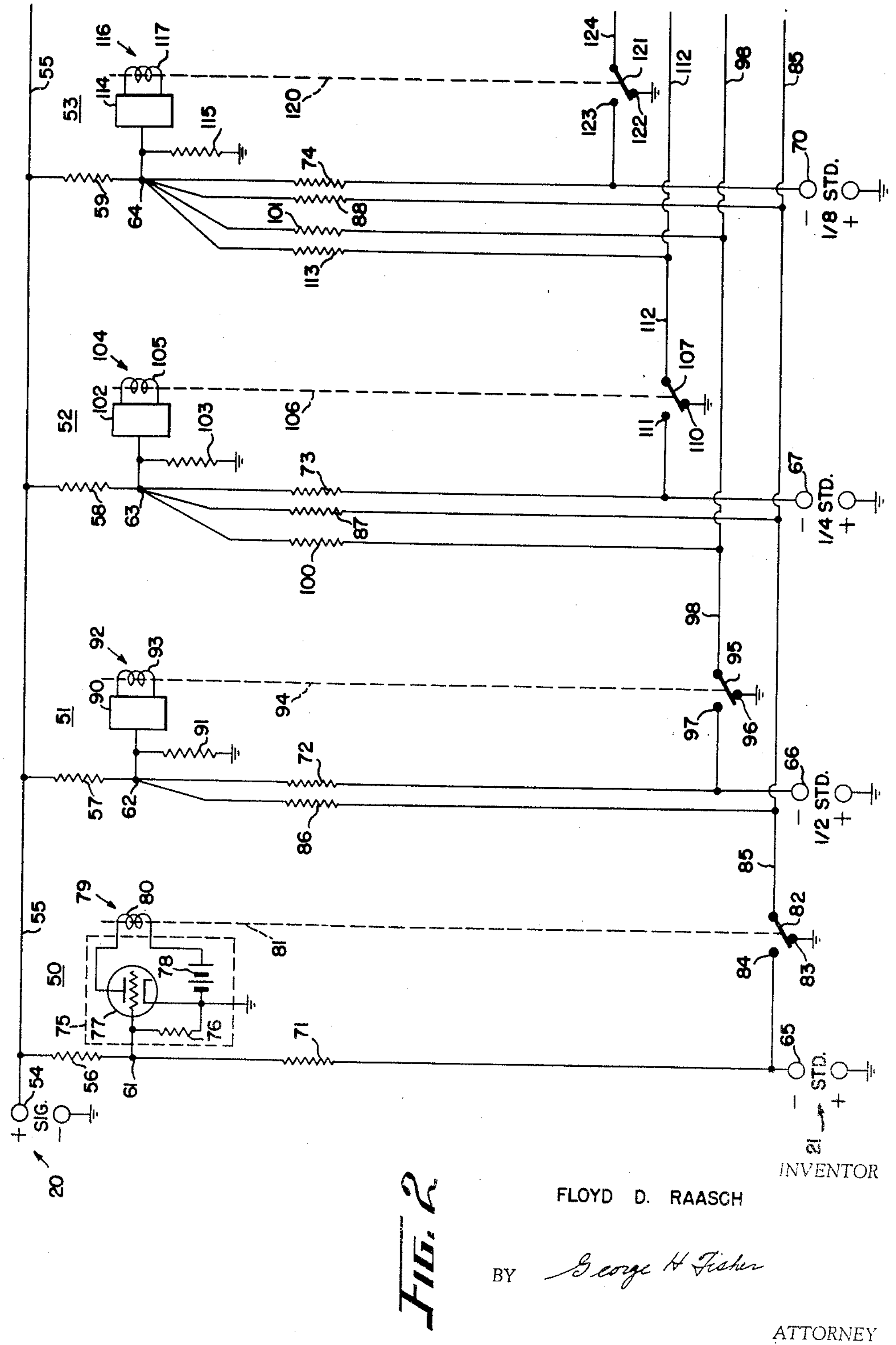
Figure 2 shows one specific quantizer relying on switching operation to give the non-linearity on which quantizer operation is based.

Reference should now be made to Figure 2, which shows four quantizer stages, generally indicated at 50, 51, 52, and 53. Figure 2 is arranged for direct voltages, but can easily be arranged for alternating voltages, as is shown in connection with other modifications. Signal 20 is supplied between terminal 54 and ground, and is applied through conductor 55 and summing resistors 56, 57, 58, and 59, to summation points 61, 62, 63, and 64, respectively. Source 21 is shown as supplying between terminals 65, 66, 67, and 70, respectively and ground a standard voltage, a half-standard voltage, a quarter-standard voltage and an eighth-standard voltage. The standard voltage is equal in magnitude to half the maximum value of the signal anticipated. The voltages on terminals 65, 66, 67, and 70 are supplied to summation points 61, 62, 63, and 64 through summing resistors 71, 72, 73, and 74, all respectively. Each stage includes an amplifier and discriminator unit energized from the summation point and arranged to supply a relay operating output. The units are identical and only one has been shown in more than block diagram form. Unit 75 is shown to be connected to summation point 61 and to comprise an input resistor 76, a triode 77, and a source of anode potential 78 for the triode. It is connected to energize a relay 79 having a winding 80 which actuates an armature 81 to displace a movable contact 82 out of normal engagement with a first fixed contact 83 and into engagement with a second fixed contact 84. Fixed contact 83 is grounded. Fixed contact 84 is connected to terminal 65 of source 21. Movable contact 82 is connected to summation points 62, 63, and 64 by conductor 85 and resistors 86, 87, and 88, respectively. Armature 81 is also extended to indicate the operation of the stage.

Summation point 62 is connected to an amplifier and discriminator unit 90 whose input resistor is shown at 91. The output of unit 90 is supplied to a relay 92 having a winding 93 which actuates an armature 94 to displace a movable contact 95 out of normal engagement with a first fixed contact 96 and into engagement with a second fixed contact 97. Fixed contact 96 is grounded. Fixed contact 97 is connected to terminal 66 of source 21. Movable contact 95 is connected to summation points 63 and 64 through conductor 98 and summing resistors 100 and 101, respectively. Armature 94 is extended to indicate the operation of the stage.

Summation point 63 is connected to an amplifier and discriminator unit 102 whose input resistor is shown at 103. The output of unit 102 is supplied to a relay 104 having a winding 105 which actuates an armature 106 to displace a movable contact 107 out of normal engagement with a first fixed contact 110 and into engagement with a second fixed contact 111. Fixed contact 110 is grounded. Fixed contact 111 is connected to terminal 67 of source 21. Movable contact 107 is connected to summation point 64 through conductor 112 and summing resistor 113. Armature 106 is extended to indicate the operation of the stage.

Summation point 64 is connected to an amplifier and discriminator unit 114 whose input resistor is shown at 115. The output of unit 114 is supplied to a relay 116 having a winding 117 which actuates an armature 120 to displace a movable contact 121 out of normal engagement with a first fixed contact 122 and into engagement with a second fixed contact 123. Fixed contact 122 is grounded. Fixed contact 123 is connected to terminal 70 of source 21. Movable contact 121 is connected to conductor 124. Armature 120 is extended to indicate the operation of the stage.

Resistors 56, 57, 58, 59, 71, 72, 73, 74, 86, 87, 88, 100, 101 and 113 are all of the same resistance. The signal and standard voltages, which do not reverse, are so polarized with respect to ground that they oppose one another at the respective summation points, as indicated by the polarities at terminals 54, 65, 66, 67, and 70.

Operation is as follows. For a zero signal none of relays 79, 92, 104, and 116 are operated. The voltages supplied to summation points 61, 62, 63, and 64 are $$-\frac{s}{2},\ -\frac{s}{4},\ \text{and}\ -\frac{s}{8}$$

respectively, where $s$ is one-half the maximum value of $x$, the signal.

As $x$ increases it exceeds the value $$\frac{s}{8}$$

The sense of the input to unit 114 now reverses, and relay 116 pulls in. If stage 53 is the last stage, no result follows in the quantizer from the operation of relay 116, although its indicating function is properly performed.

As $x$ continues to increase it exceeds the value $$\frac{s}{4}$$

The sense of the input to unit 102 now reverses, and relay 116 pulls in, performing its indicating function and supplied a $s/4$ voltage from terminal 67 through resistor 113 to summation point 64. Since resistors 59, 74 and 113 are equal, the signal of $$+\frac{s}{4}$$

is now opposed by the opposite and greater sum of standard voltages $$-\frac{s}{4}\ \text{and}\ -\frac{s}{8},\ \text{or}\ -\frac{3s}{8}$$

and relay 116 drops out, changing its indication accordingly.

As $x$ continues to increase, it exceeds the value $$\frac{3s}{8}$$

The sense of the input to amplifier 114 now reverses and relay 116 again pulls in, so that both relay 116 and 104 are operated. Table I shows the operation of the overall device for values of $x$ from zero to $$\frac{15s}{8}$$

The indication of the device remains the same after $x$ passes a value $$\frac{15s}{8}$$

no matter how much larger $x$ becomes.

*Table I*

| Value of $x$ | Relay 79 | Relay 92 | Relay 104 | Relay 116 |
|---|---|---|---|---|
| 0 | | | | |
| $\frac{s}{8}$ | | | | Operated. |
| $\frac{s}{4}$ | | | Operated | |
| $\frac{3s}{8}$ | | | do | Do. |
| $\frac{s}{2}$ | | Operated | | |
| $\frac{5s}{8}$ | | do | | Do. |
| $\frac{3s}{4}$ | | do | Operated | |
| $\frac{7s}{8}$ | | do | do | Do. |
| $s$ | Operated | | | |
| $\frac{9s}{8}$ | do | | | Do. |
| $\frac{5s}{4}$ | do | | Operated | |
| $\frac{11s}{8}$ | do | | do | Do. |
| $\frac{3s}{2}$ | do | Operated | | |
| $\frac{13s}{8}$ | do | do | | Do. |
| $\frac{7s}{4}$ | do | do | Operated | |
| $\frac{15s}{8}$ | do | do | do | Do. |

This table shows that as the signal voltage increases continuously the condition of the relays is a digital indication of the signal in the simple binary system.

It is obvious that if the value of $x$ decreases instead of increasing, the inputs to the amplifiers reverse in sense at the appropriate values for $x$, and the operation of the apparatus remains proper.

The above described apparatus gives a four-place binary indication of the value of $x$. Increase in the number of places is accomplished simply by adding further quantizer stages. If the standard voltages are still related as increasing negative powers of two, that is, as $$\frac{s}{16},\ \frac{s}{32},\ \frac{s}{64},\ \text{and}\ \frac{s}{128}$$

the indication remains a single binary number. It is sometimes convenient to modify the indications of the device so that they present the separate digits of a decimal number, each digit however, being expressed in binary form. This is accomplished as will now be described.

Figure 3:
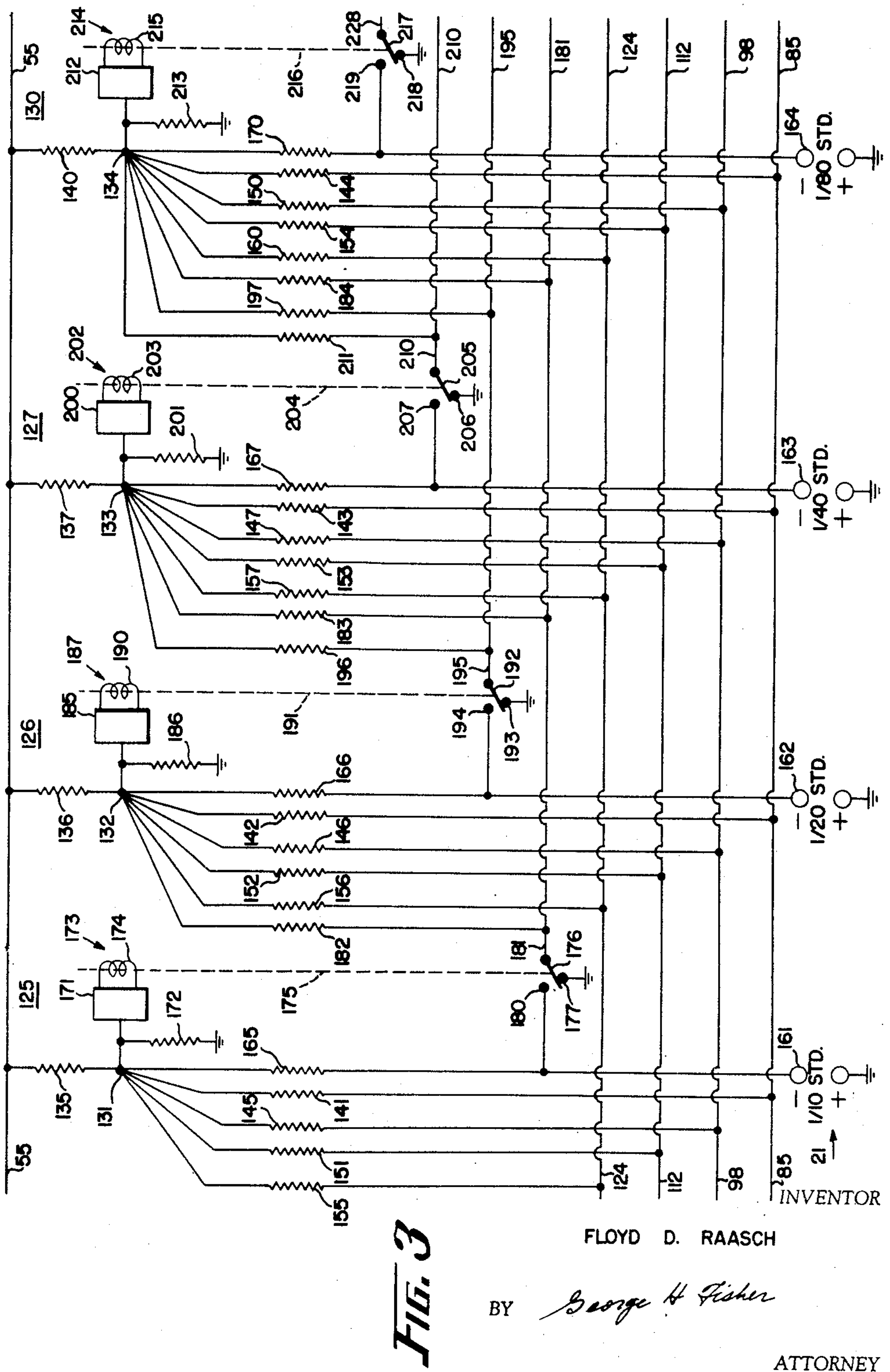
Figure 3 shows a modification of Figure 2 adapted to give separate binary outputs corresponding to decimal digits.

Figure 3 is shown as continuous with Figure 2, conductors 55, 85, 98, 112, and 124 being those in the earlier figure extended. Four additional quantizer stages 125, 126, 127, and 130 are shown in Figure 3 to have summation points 131, 132, 133, and 134 energized from conductor 55 through summing resistors 135, 136, 137, and 140, all respectively. Conductor 85 is connected to summation points 131, 132, 133, and 134 by summing resistors 141, 142, 143, and 144, respectively. Conductor 98 is connected to summation points 131, 132, 133, and 134 by summing resistors 145, 146, 147, and 150 respectively. Conductor 112 is connected to summation points 131, 132, 133, and 134 by summing resistors 151, 152, 153, and 154 respectively. Conductor 124 is connected to summation points 131, 132, 133, and 134 by summing resistors 155, 156, 157, and 160 respectively. Source 21 is shown as supplying further voltages at terminals 161, 162, 163, and 164, which are connected to summation points 131, 132, 133, and 134 by summing resistors 165, 166, 167, and 170, all respectively.

Quantizer stage 125 includes an amplifier and discriminator unit 171 whose input resistor is shown at 172. The output of unit 171 is supplied to a relay 173 comprising a winding 174 which actuates an armature 175 to displace a movable contact 176 out of normal engagement with a first fixed contact 177 and into engagement with a second fixed contact 180. Fixed contact 177 is grounded. Fixed contact 180 is connected to terminal 161 of source 21. Movable contact 176 is connected to summation points 132, 133, and 134 by conductor 181 and summing resistors 182, 183, and 184, respectively.

Quantizer stage 126 includes an amplifier and discriminator unit 185 whose input resistor is shown at 186. The output of unit 185 is supplied to a relay 187 comprising a winding 190 which actuates an armature 191 to displace a movable contact 192 out of normal engagement with a first fixed contact 193 and into engagement with a second fixed contact 194. Fixed contact 193 is grounded. Fixed contact 194 is connected to terminal 162 of source 21. Movable contact 192 is connected to summation points 133 and 134 by conductor 195 and summing resistors 196 and 197, respectively.

Quantizer stage 127 includes an amplifier and discriminator unit 200 whose input resistor is shown at 201. The output of unit 200 is supplied to a relay 202 comprising a winding 203 which actuates an armature 204 to displace a movable contact 205 out of normal engagement with a first fixed contact 206 and into engagement with a second fixed contact 207. Fixed contact 206 is grounded. Fixed contact 207 is connected to terminal 163 of source 21. Movable contact 205 is connected to summation point 134 by conductor 210 and summing resistor 211.

Quantizer stage 130 includes an amplifier and discriminator unit 212 whose input resistor is shown at 213. The output of unit 212 is supplied to a relay 214 comprising a winding 215 which actuates an armature 216 to displace a movable contact 217 out of normal engagement with a first fixed contact 218 and into engagement with a second fixed contact 219. Fixed contact 220 is grounded. Fixed contact 221 is connected to terminal 164 of source 121. Movable contact 217 is connected to conductor 228.

It is thus apparent that Figure 3 is structurally a straightforward continuation of Figure 2. If the voltages at terminals 161, 162, 163, and 164 were respectively 1/16, 1/32, 1/64, and 1/128 of standard, the two figures together would show an eight-place binary quantizer. However, the ratio between the voltage at terminal 161 of Figure 3 and that at terminal 70 of Figure 2 is not 1:2, but 4:5. The ratios for terminals 162, 163, and 164 are successively 1/2, 1/4, and 1/8 that at terminal 161, so the increasing negative power of two relationship is again restored. In other words, the voltages at terminals 161, 162, 163 and 164 are $$-\frac{s}{10},\ -\frac{s}{20},\ -\frac{s}{40} \text{ and } -\frac{s}{80}$$

respectively.

The operation of this modification differs from that of Figure 2 only in stage 125, as it is between this stage and stage 53 that the decimal division of the input is to occur. It is required that an increase of only two units of voltage—now 1/80 standard in magnitude—occur between operation of relay 173 and operation of relay 116. This limits the largest number which can be expressed in binary form by the indication of relays 173, 187, 222 and 214 to nine instead of to fifteen, nine being the largest digit in the decimal system. Relay 116 operates when the signal reaches 1/8 standard and relay 173 operates when the signal reaches 1/10 standard. The difference, 2/80 standard, is exactly equal to two increments of signal, which is the result desired.

Suppose the signal to have increased from zero to a magnitude of nine units. Then according to the principles explained in connection with Figure 2, relays 173 and 214 are operated and relays 77, 92, 104, 114, 187, and 202 are normal. If the signal increases to 10 units, relay 116 pulls in, supplying voltage from terminal 70 to summation points 131, 132, 133, and 134. The standard voltages at summation point 131 is now 1/8 standard plus 1/10 standard, or 18 units, which is larger than 10 units, so relay 173 drops out. The standard voltage on summation point 132 is now 1/8 standard plus 1/20 standard or 14 units, so relay 187 does not pull in. The standard voltage at summation point 133 is now 1/8 plus 1/40 standard, or 12 units, so relay 202 does not pull in. The standard voltage at summation point 134 is 1/8 plus 1/80 standard, or 11 units, and relay 214 drops out. A further increase of one unit in the signal causes relay 214 to pull in as described in connection with Figure 2.

It is thus apparent that the structure of Figures 2 and 3 together differs from a simple eight-stage binary quantizer only in the choice of voltages for the second decimal unit, and in the estabilshment of 1/80 rather than 1/128 standard as the unit of voltage increment. These changes result in an output representing in simple binary form two digits of a decimal number. If a third decimal stage is desired, the structure is extended as is obvious to those skilled in the art in view of the above teaching: the standard voltages for the next four stages being 1/100, 1/200, 1/400, and 1/800 standard.

Figures 5, 15:
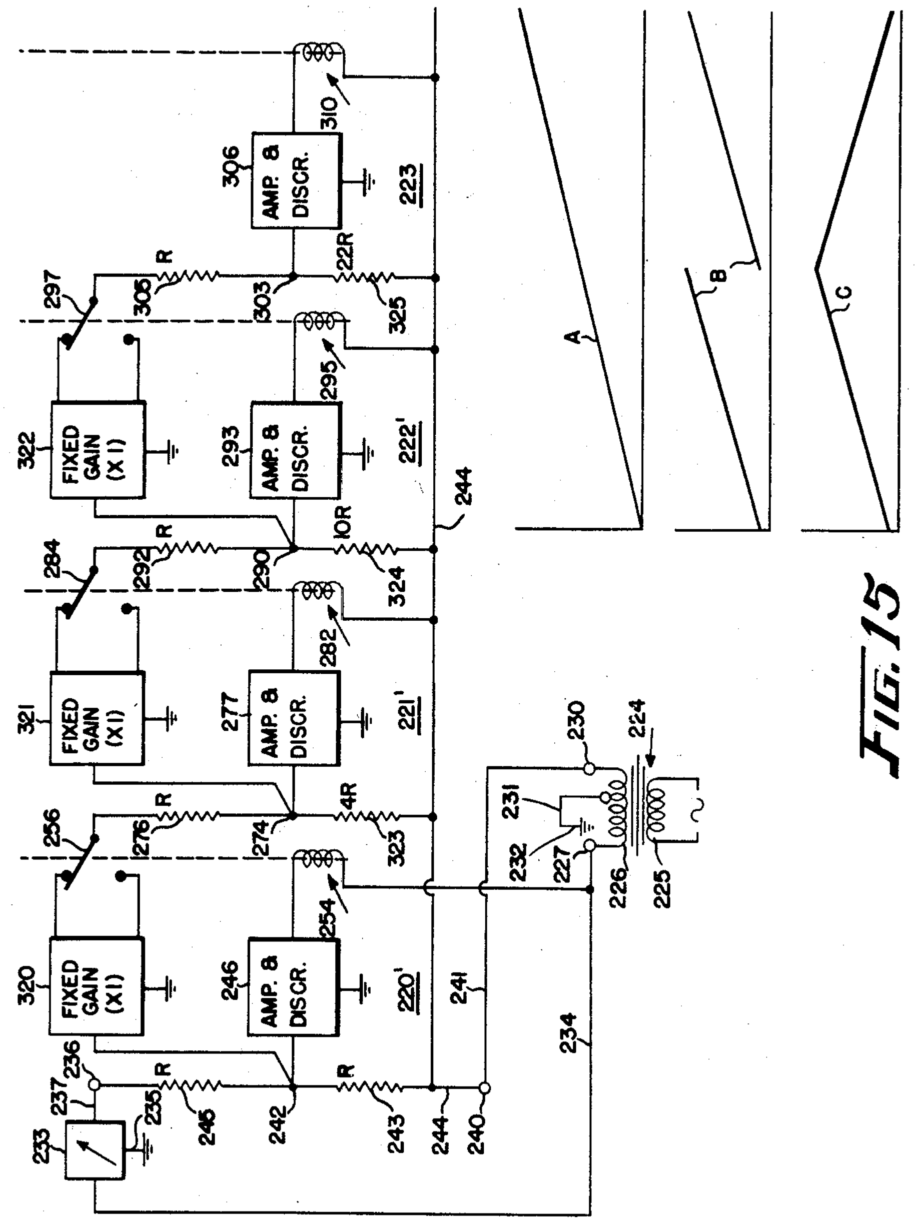
Figure 15 is a diagram illustrative of the relation between computers based on progressive and simple number systems.

The foregoing quantizers are based on the binary number system: quantizers about to be described are based on the progressive binary number system. The difference is shown in Figure 15, where curve A represents a signal, to a quantizer stage, which varies from zero to some value. If the output from the quantizer stage may be represented by a discontinuous line B, the stage is simple binary: if the output may be represented by a broken line C, the stage is progressive binary.

Figure 4:
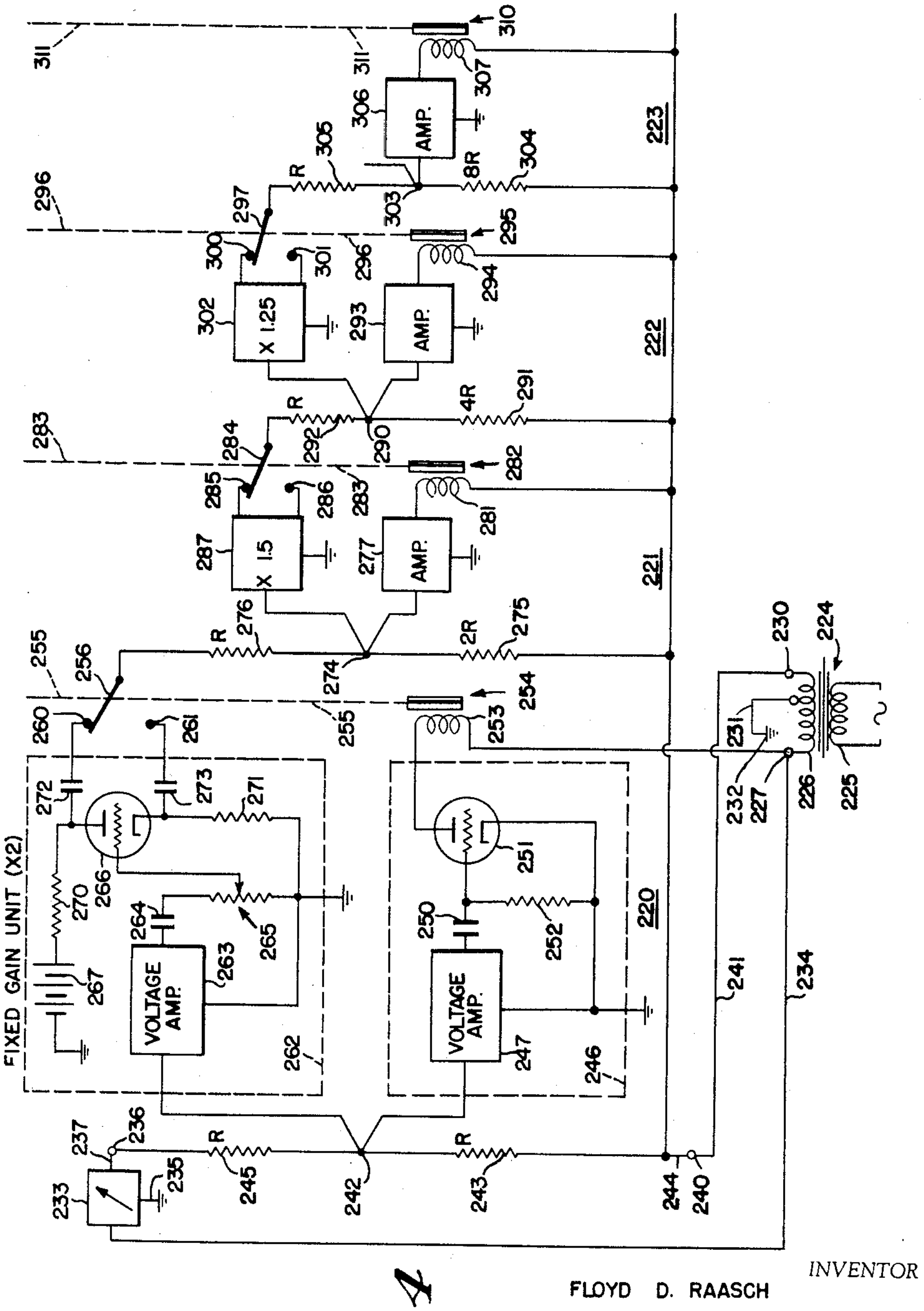
Figures 4, 5 and 6 show additional quantizers relying on switching operation to give the desired non-linearity.

In Figure 4 there is shown apparatus having a plurality of quantizer stages 220, 221, 222, and 223. In this embodiment of the invention the signal and standard voltages are shown as alternating rather than direct, and as derived from a transformer 224 having a primary winding 225 and a secondary winding 226 with end terminals 227 and 230 and an intermediate tap 231 so positioned that the voltage between tap 231 and terminal 227 is twice that between tap 231 and terminal 230. Tap 231 is connected to ground at 232, so that the voltages at terminals 227 and 230 are in 180 degree phase relationship with respect to ground.

The block identified by reference character 233 represents any suitable analogue signal device, energized from terminal 227 and tap 231 of secondary winding 226 through conductor 234 and ground connections 235 and 232. The output of device 233 is supplied to signal input terminal 236 of the apparatus through conductor 237 to comprise a signal voltage. Standard terminal 240 of the apparatus is energized from terminal 230 of secondary winding 226 through a conductor 241.

Quantizer stage 220 is shown to comprise a summation point 242 energized from standard input terminal 240 through a summing resistor 243 and conductor 244, and from signal input terminal 236 through a summing resistor 245. Energized from summation point 242 is an amplifier and discriminator unit 246 shown to comprise a voltage amplifier 247, a coupling capacitor 250, and a phase discriminating triode 251 having an input resistor 252. The anode of triode 251 is connected to secondary terminal 227 through the winding 253 of a relay 254 having an armature 255 actuable to displace a movable contact 256 out of normal engagement with a first fixed contact 260 and into engagement with a second fixed contact 261. Armature 255 is also extended to indicate the operation of the stage.

The voltage at summation point 242 is also supplied to a fixed gain unit 262 shown to comprise a voltage amplifier 263, a coupling capacitor 264, a gain setting voltage divider 265, a phase inverter triode 266 including a source 267 of anode potential and equal anode and cathode resistors 270 and 271, and coupling capacitors 272 and 273 connected to relay contacts 260 and 261. The gain of unit 262 is set to be equal to the ratio of the sum of the resistances of resistors 245 and 243 to the resistance of resistor 243: the resistances of these resistors are equal, so the gain is set at 2.

The nature of unit 262 is such that when the voltage at summation point 242 is zero no outputs are supplied on capacitors 272 and 273. When voltage appears at summation point 242, voltages of double this magnitude are supplied through capacitors 272 and 273: the voltages are of opposite phase, and are supplied to fixed contacts 260 and 261 of relay 254. If the voltage at summation point 242 reverses in phase, so do both the voltages at the fixed relay contacts. The voltage supplied through amplifier 263 is always of the same phase as that at summation point 242.

Unit 246 operates to energize relay winding 253 when the voltage at summation point 242 is of the same phase as that supplied relay winding 253, that is, when the signal voltage is greater than the standard voltage. When this happens, movable contact 256 engages fixed contact 261, receiving a signal of the same phase as that at secondary terminal 227. When the signal voltage is less than the standard voltage, relay 254 is not energized, and movable contact 256 engages fixed contact 260, receiving a signal of the opposite phase to that at summation point 242. Thus the signal on movable contact 256 is always in phase with that at secondary terminal 227.

Quantizer stage 221 is shown to comprise a summation point 274, energized from standard input terminal 240 through a summing resistor 275 and conductor 244, and from movable contact 256 of relay 254 through a summing resistor 276. Energized from summation point 274 is an amplifier and discriminator unit 277 like unit 246, connected to secondary terminal 230 through conductor 244 and the winding 281 of a relay 282 having an armature 283 actuable to displace a movable contact 284 out of normal engagement with a first fixed contact 285 and into engagement with a second fixed contact 286. Armature 283 is also extended to indicate the operation of the stage.

The voltage at summation point 274 is also supplied to a fixed gain unit 287, like unit 262, connected to relay contacts 285 and 286. The gain of unit 287 is set to be equal to the ratio of the sum of the resistances of resistors 276 and 275 to the resistance of resistor 175: resistor 275 has twice the resistance of resistor 276, so the gain is set at 1.5.

Unit 277 operates to energize relay winding 281 when the voltage at summation point 274 is of the same phase as that supplied relay winding 281. When this happens movable contact 284 engages fixed contact 286, receiving a signal of the same phase as that at secondary terminal 230. When the voltage at summation point 274 is of the opposite phase to that supplied relay winding 281, the relay is not energized, and movable contact 284 engages fixed contact 285, receiving a signal of the opposite phase to that at summation point 274. Thus the signal on movable contact 284 is always in phase with that at secondary terminal 230.

Quantizer stage 222 is shown to comprise a summation point 290, energized from standard input terminal 240 through a summing resistor 291 and conductor 244, and from movable contact 284 of relay 282 through a summing resistor 292. Energized from summation point 290 is an amplifier and discriminator unit 293 like unit 246, connected to secondary terminal 230 through conductor 244 and the winding 294 of a relay 295 having an armature 296 actuable to displace a movable contact 297 out of normal engagement with a first fixed contact 300 and into engagement with a second fixed contact 301. Armature 296 is also extended to indicate the operation of the stage.

The voltage at summation point 290 is also supplied to a fixed gain unit 302 like unit 262, connected to relay contacts 300 and 301. The gain of unit 302 is set to be equal to the ratio of the sum of the resistances of resistors 292 and 291 to the resistance of resistor 291: resistor 291 has four times the resistance of resistor 292, so the gain is set at 1.25.

Unit 293 operates to energize relay winding 294 when the voltage at summation point 290 is of the same phase as that supplied relay winding 294. When this happens, movable contact 297 engages fixed contact 301, receiving a signal of the same phase as that at secondary terminal 230. When the voltage at summation point 290 is of the opposite phase to that supplied relay winding 295, the relay is not energized, and movable contact 297 engages fixed contact 300, receiving a signal of the opposite phase to that at summation point 290. Thus the signal on movable contact 297 is always in phase with that at secondary terminal 230.

Quantizer stage 223 is shown to comprise a summation point 303, energized from standard input terminal 240 through a summing resistor 304 and conductor 244, and from movable contact 292 of relay 295 through a summing resistor 305. Energized from summation point 303 is an amplifier and discriminator unit 306 like unit 46, connected to secondary terminal 230 through conductor 244 and the winding 307 of a relay 310 having an armature 311 which is extended to indicate the operation of the stage. Since this is the final stage of the quantizer shown in the figure, the switching functions of the earlier relays are not needed. It is likewise unnecessary to provide for quantizer stage 224 a unit like units 262, 287, and 302. Resistors 243, 245, 276, 292 and 305 have the same resistance while resistors 275, 291 and 304 have respectively, 2, 4 and 8 times this resistance.

If the signal voltage is zero, the voltage at summation point 242 is minus one-half standard. Relay 254 is not operated, and a voltage of plus 1 standard appears at movable contact 256. The voltage at summation point 274 is plus one-third standard: this voltage is out of phase with that supplied to relay winding 281, and relay 282 remains unoperated. The voltage to summation point 290 is plus one-half standard: this voltage is out of phase with that supplied to relay winding 294, and relay 295 remains unoperated. The voltage at summation point 303 is plus one-half standard: this voltage is out of phase with that supplied to relay winding 307, and relay 310 remains unoperated. Thus for a zero signal setting no relay is energized.

As the signal increases from zero, the voltages on the quantizer assume the values shown in Figure 16, from which it will be apparent that the relay operation in this figure presents the input signal digitally in the binary system according to the progressive code rather than the conventional fashion. This has the advantage that in changing from one digit to the next only one relay needs to operate or release as compared to the operation of up to four relays in the simple binary presentation.

Figure 5 shows a slight modification of the structure of Figure 4: the elements which are the same in both figures are given the same reference numerals. The differences between the structures reside in the settings of the fixed gain units and the values of three summing resistors. In Figure 5 the fixed gain units for quantizer stages 220, 221 and 222 are indicated by reference numerals 320, 321 and 322, respectively: each is adjusted to have a gain of one. Summing resistors 323, 324, and 325 are connected to conductor 244 and summation points 274, 290 and 303, respectively: their resistances are respectively, 4, 10 and 22 times that of the other summing resistors. Aside from these changes, the structures of the two figures are the same.

Figure 17 shows the voltages in the structure of Figure 5, and it will be seen that this arrangement operates just as it does that of Figure 4: the changes in the gain of the fixed gain units are thus satisfactorily compensated for by the changes in summing resistors.

The relation between the resistances of resistors 243, 323, 324 and 325 is of interest, because from it can be determined the magnitude of analogous resistors in additional quantizer stages. Counting stage 220 as stage number 1, the resistance of the summing resistor in the $n$th stage is A times the resistance of resistor 243, where A is defined by the equation $A=2^n+2^{(n-1)}-2$.

Figure 6:
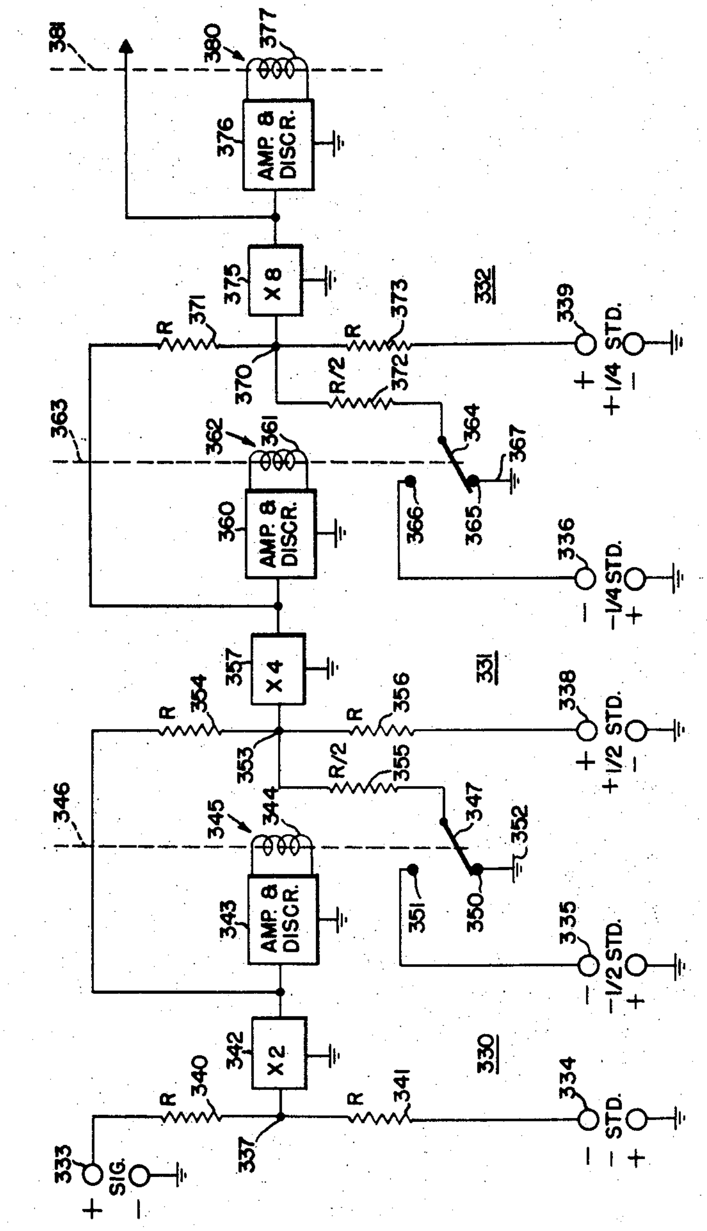

Figure 6 shows three stages of a slightly different structure, which are identified by reference numerals 330, 331, and 332. The signal input to the apparatus is supplied between an input terminal 333 and ground, and the minus standard, minus half-standard and minus quarter-standard voltages are supplied to the apparatus between terminals 334, 335, and 336 respectively and ground. In addition, plus half-standard and plus quarter-standard voltages are supplied between terminals 338 and 339 respectively and ground.

Quantizer stage 330 is shown to comprise a summation point 337 connected to terminals 333 and 334 through summing resistors 340 and 341. Summation point 337 is connected to a fixed gain unit 342 having a gain of two, and the output is supplied to an amplifier and discriminator unit 343 which energizes the winding 344 of a relay 345 having an armature 346 which actuates a movable contact 347 out of normal engagement with a first fixed contact 350 and into engagement with a second fixed contact 351. Fixed contact 350 is grounded at 352. Fixed contact 351 is connected to terminal 335.

Quantizer stage 331 is shown to comprise a summation point 353: the output of unit 342 of stage 330 is supplied to summation point 353 through summing resistor 354, and the summation point is connected to movable contact 347 of stage 330 and to terminal 338 through summing resistors 355 and 356 respectively. Energized from summation point 353 is a fixed gain unit 357 having a gain of four, and the output is supplied to an amplifier and discriminator unit 360 which energizes the winding 361 of a relay 362 having an armature 363 which actuates a movable contact 364 out of normal engagement with a first fixed contact 365 and into engagement with a second fixed contact 366. Fixed contact 365 is grounded at 367. Fixed contact 366 is connected to terminal 336.

Quantizer stage 332 is shown to comprise a summation point 370: the output of unit 357 of stage 331 is supplied to summation point 370 through summing resistor 371, and the summation point is connected to movable contact 364 of stage 331 and to terminal 339 through summing resistors 372 and 373, respectively.

Energized from summation point 370 is a fixed gain unit 375 having a gain of eight, and the output is supplied to an amplifier and discriminator unit 376 which energizes the winding 377 of a relay 380 having an armature 381. Armatures 346, 363 and 381 of relays 345, 362, and 380 are extended to afford indications of the operation of the quantizer stages.

Resistors 340, 341, 354, 356, 371, and 373 are all of the same resistance, while resistors 355 and 372 are of half this resistance.

Figure 18 shows voltages in the structure of Figure 6, from which the basic quantizer action of the apparatus may readily be observed: the output of this quantizer is a simple binary one.

Figure 7:
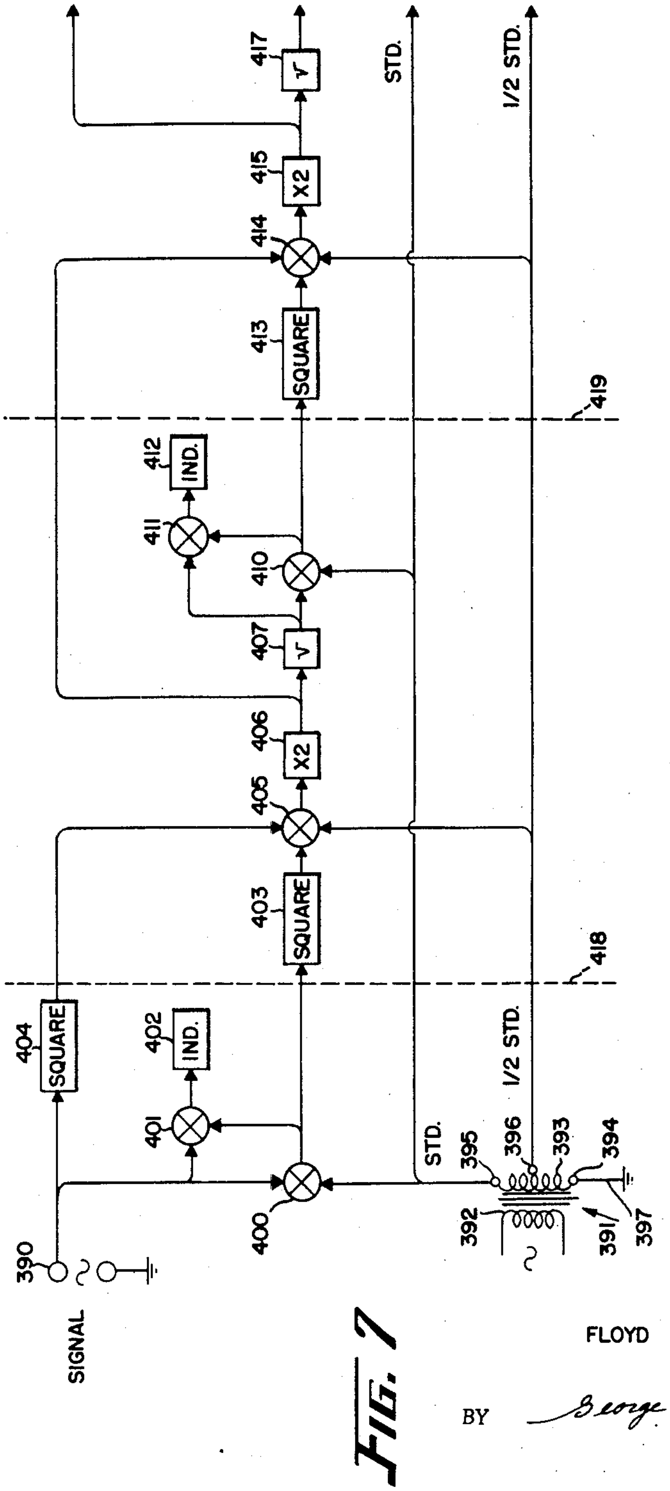
Figure 7 shows a quantizer relying on squaring and square-rooting apparatus to give the desired non-linearity.
Figure 8:
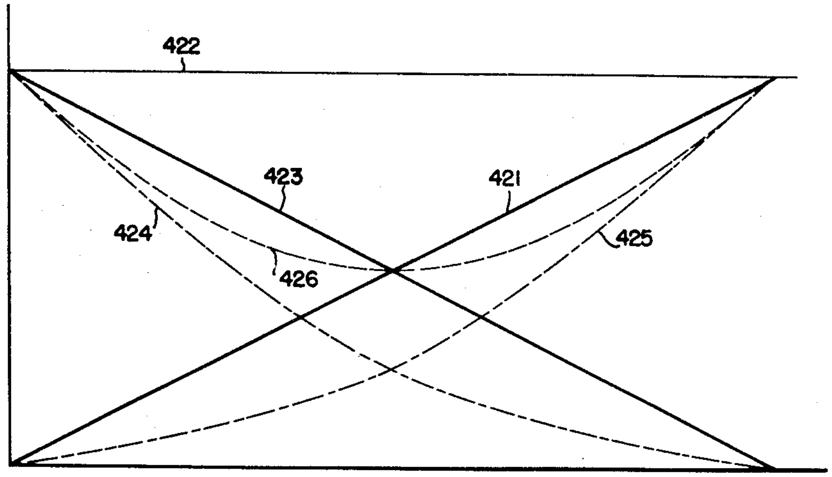
Figures 8–11 are diagrams illustrative of voltage relations in the structure of Figure 7.
Figure 9:
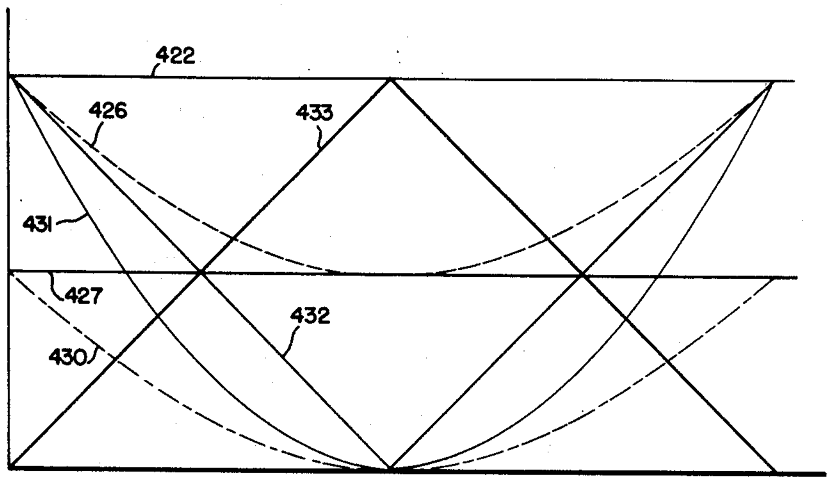
Figure 10:
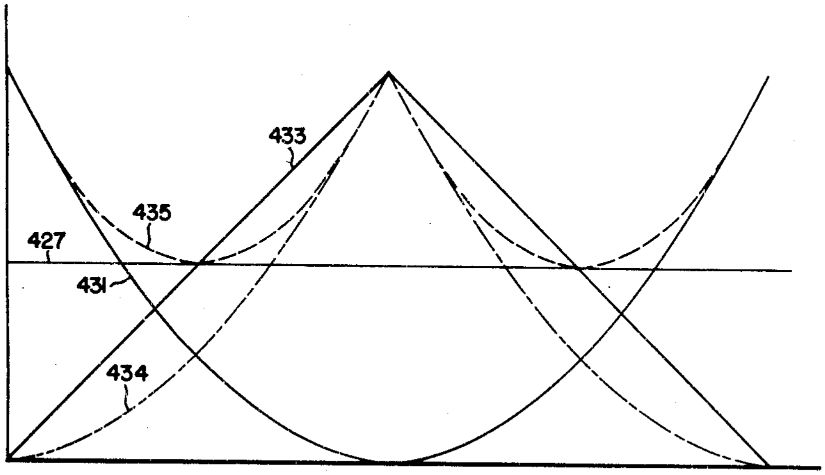
Figure 11:
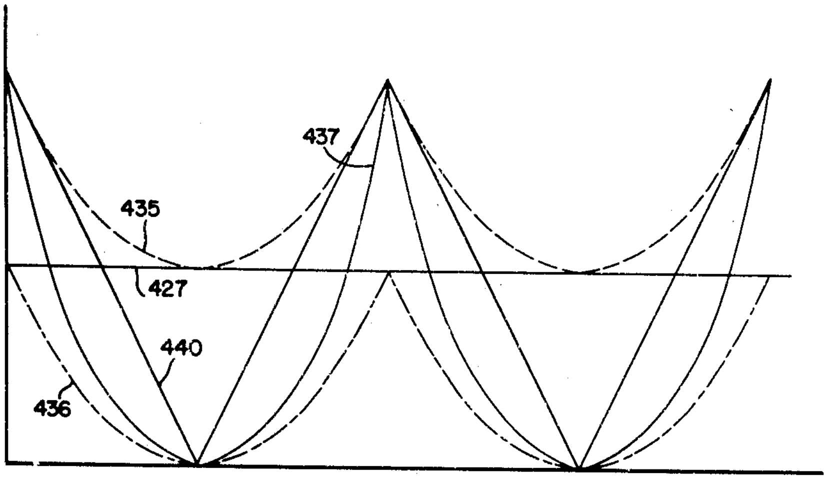

In the structures heretofore described the necessary nonlinearity of operation has been brought about by the use of switching apparatus, but this is not a necessary part of the inventive concept. Figure 7 shows apparatus in which the nonlinearity is exponential rather than stepwise.

In Figure 7 an alternating signal voltage of a first phase appears between a signal terminal 390 and ground. Standard voltages of the frequency of the signal and of opposite phase thereto are supplied by a transformer 391 having a primary winding 392 and a secondary winding 393 with terminals 394 and 395 and a center tap 396. Terminal 394 is grounded at 397. The full secondary voltage is equal to maximum anticipated signal.

Signal terminal 390 and standard terminal 395 supply inputs to a comparing device 400 which gives an output determined by the difference between its inputs. The output from device 400, and the signal at terminal 390, are supplied as inputs to a comparing device 401 like device 400, which also gives an output determined by the difference between its inputs. This output is supplied to an indicator 402 which gives one of two indications depending on the sense of the output of device 401.

The output of device 400 is supplied to a squaring device 403, and the signal on terminal 390 is supplied to a squaring device 404. The squared outputs are supplied to a comparing device 405, together with a voltage from center tap 396 of transformer 391. This device subtracts the last named voltage from the sum of the squared outputs, and the difference is supplied to a multiplying device 406 having a gain of two.

The output of device 406 is supplied to a square root taking device 407, and the root signal obtained is supplied to a comparing device 410 like device 400 together with a signal from terminal 395 of the transformer. The output of device 410 and the output of device 407 are supplied to a further comparing device 411 like device 400, which energizes an indicator 412 like indicator 402.

The output of device 410 is also fed to a squaring device 413, and the squared output is supplied to a comparing device 414 like device 405, together with the output of device 406 and a voltage from tap 396 of transformer 391. Device 414 subtracts the last named voltage from the sum of the squared outputs, and the difference is supplied to a multiplying device 415 like device 406, and thence to a root taking device 417 like device 407.

The first quantizer stage in this modification of the invention lies to the left of the broken line 418, and the second quantizer stage lies between that line and broken line 419. Replication of the second stage may be carried on as many times as is desired to obtain the required number of places in the binary output, which is read from indicators 402, 412, etc.

Figures 8–11 illustrate the operation of this embodiment of the invention. The vertical axis is in arbitrary units of voltage, and the horizontal axis is in arbitrary units of time. The sloping line 421 shows the signal at 390 varying through its range from zero to maximum. The horizontal line 422 represents the voltage at terminal 395: since it is of opposite phase, the difference between the two supplied by device 400 is shown by sloping line 423. The point where lines 421 and 423 intersect is the point at which indicator 402 changes its indication.

Exponential curves 424 and 425 show the outputs of squaring devices 403 and 404 respectively: their sum is represented by curve 426, and the oppositely phased output of constant magnitude at center tap 396 is represented by the horizontal line 427. Curve 430 represents the difference signal supplied to device 405, and 431 shows the voltage after multiplying device 406 has acted.

The line 432 shows the change in the signal produced by the root taking device 407, and the line 433 shows the output from device 410. The points of intersection between lines 432 and 433 are points at which indicator 407 changes its indication.

The signal represented by line 434 is the output of squaring device 413. Curve 435 represents the sum of this curve and curve 431. Curve 436 is the output of device 414 and curve 437 is the output of multiplier 415. The line 440 represents the output of square root taking device 417.

From the foregoing it will be evident that means have been provided which act, when a signal is supplied thereto which once crosses an axis, to give an output which twice crosses the axis: the lines 421, 432 and 440 of Figures 8–11 clearly illustrate this, and the binary characteristic of the indication of indicators 402 and 412 of Figure 7 is at once apparent.

Additional exactitude can be obtained by replicating the quantizer stage between broken lines 418 and 419, as is partly done in Figure 7.

Figure 12:
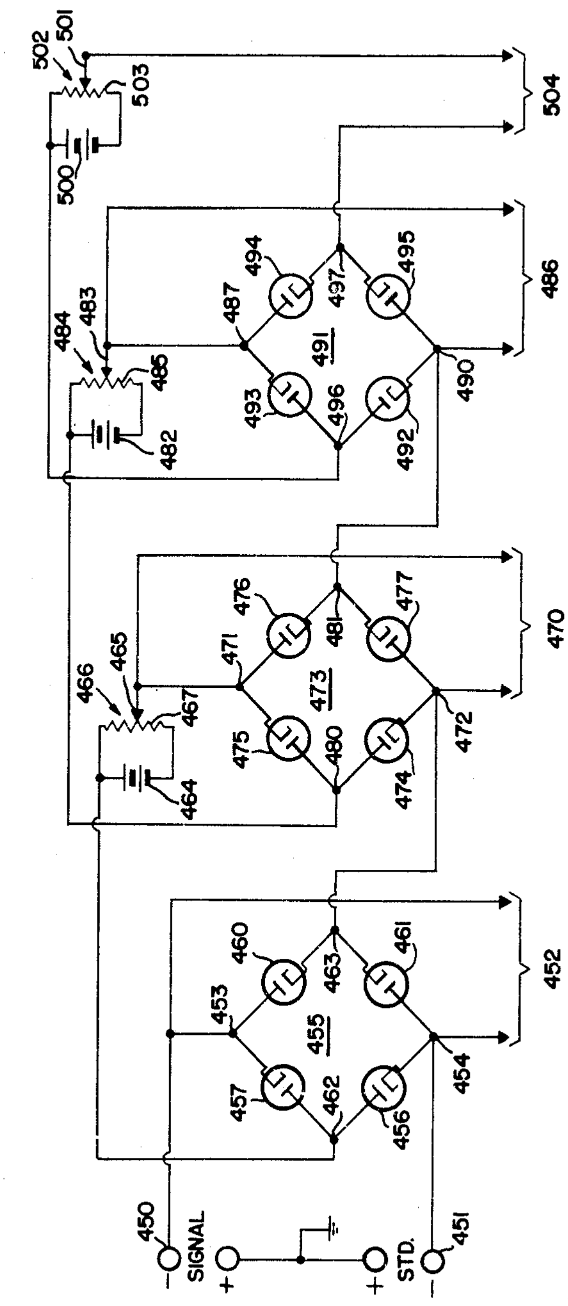
Figures 12 and 13 are diagrammatic illustrations of quantizers in which rectifiers are relied upon to give the desired non-linearity.

Positive and negative exponential elements are not the only alternatives to switching arrangements for getting the nonlinear action which is the subject of this invention: in Figure 12 the desired result is accomplished by the use of vacuum rectifiers connected in conventional rectifier bridges.

The signal is supplied between the terminal 450 and ground, and a standard voltage of half the expected signal magnitude and of opposite sense is supplied between terminal 451 and ground. The difference between these voltages determines the first binary digit and appears at 452. This difference also is applied across the input terminals 453 and 454 of a rectifier bridge 455 including vacuum rectifiers 456, 457, 460 and 461.

The bridge output appears at terminals 462 and 463, and is connected in series with a half-standard voltage derived from source 464 by adjustment of the slider 465 of a voltage divider 466 having a resistance element 467. The difference between these voltages determines the second binary digit and appears at 470. This difference is also applied across the input terminals 471 and 472 of a rectifier bridge 473 including vacuum rectifiers 474, 475, 476 and 477.

The bridge output appears at terminals 480 and 481, and is connected in series with a quarter-standard voltage derived from source 482 by adjustment of the slider 483 of a voltage divider 484 having a resistance element 485. The difference between these voltages determines the third binary digit and appears at 486. This difference is also applied across the input terminals 487 and 490 of a rectifier bridge 491 including vacuum rectifiers 492, 493, 494 and 495.

The bridge output appears at terminals 496 and 497, and is connected in series with a one-eighth standard voltage derived from source 500 by adjusting the slider 501 of a voltage divider 502 having a resistance element 503. The difference between these voltages determines the fourth binary digit and appears at 504.

Figure 13:
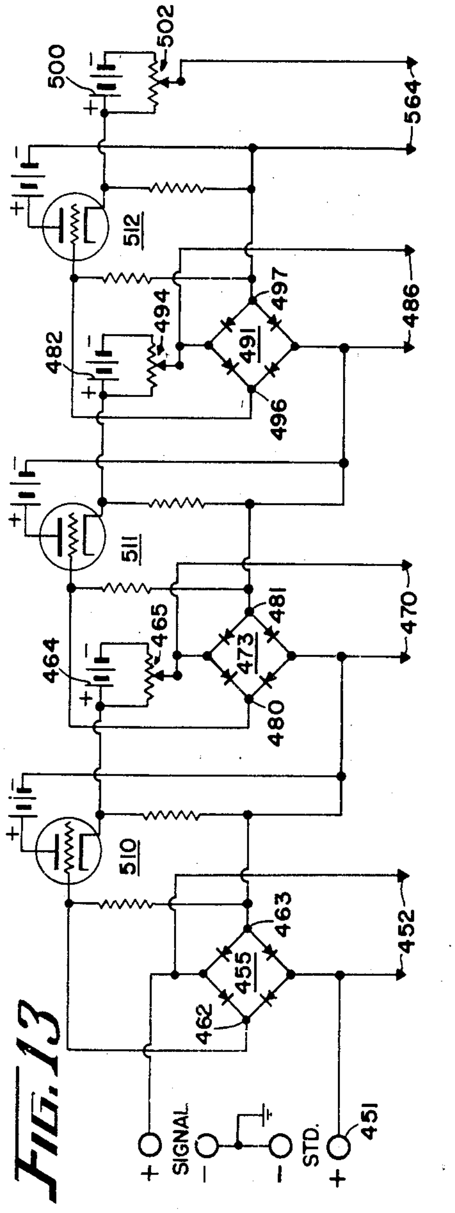

Figure 13 is a modification of Figure 12 in which the rectifiers are of the contact type rather than the vacuum type. Since the back impedance of contact rectifiers is low enough to load down preceding stages, each nonlinear stage of the apparatus of Figure 13 is isolated from the preceding stage by a conventional cathode follower, the cathode followers being identified by the general reference numerals 510, 511 and 512. Otherwise Figures 12 and 13 are the same: both give progressive binary outputs.

Figure 19 shows voltage relations in the structure of Figure 13 from which the quantizer action of the apparatus may readily be observed. The standard voltage at 451 is maintained at unit value, and the signal voltage is allowed to increase from zero to two. The tabulated data neglects the voltage drop in the rectifiers. It will be seen that the voltage applied to bridge 455, for example, reverses in sign as the signal passes one unit magnitude but that due to the action of the rectifier bridge no reversal in the polarity of the voltage at cathode follower 510 takes place. This action is repeated in each stage of the quantizer. The outputs appearing at 452, 470, 486, and 504 represent one or the other of the binary digits according as they are of one sense or of the opposite sense.

Figure 14:
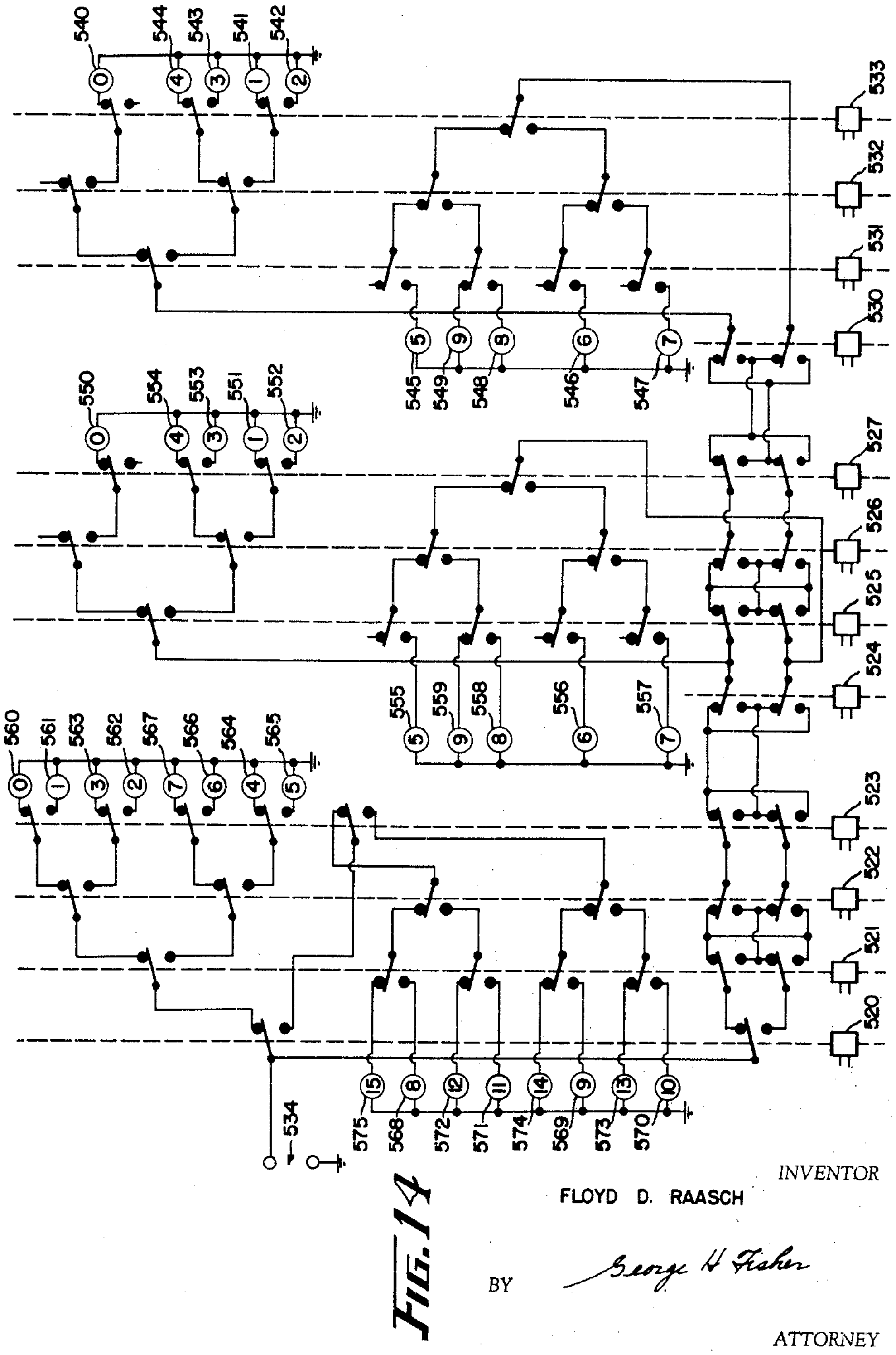
Figure 14 shows a readout circuit for giving decimal indications of an analogue input, converted to binary data by apparatus like that of Figure 4, modified as taught in connection with Figure 3.

While a binary output is well adapted for use in various computing processes, it presents data in a form which is not readily understood except by mathematicians. Figure 14 shows means giving indications, in the decimal system, of analogue signals from zero to 1599. It is adapted for use with a twelve-stage quantizer giving progressive binary relay operation, four stages of which are taught for example in Figure 4, with modification between the fourth and fifth stages and between the eighth and ninth stages necessary to give three progressive decimal digits, as described earlier. The relays operated by the twelve stages are indicated by the reference numerals 520, 521, 522, 523, 524, 525, 526, 527, 530, 531, 532, and 533. The armatures of these relays are shown as extending downwardly, for performing the nonlinear functions necessary in their respective quantizer stages, and upwardly, to control contacts distributing electrical energy from a source 534 to a plurality of indicating lamps each functioning when illuminated to display a figure in the decimal system.

At the right of Figure 14 lamps displaying in order the figures 0 to 9 for the "units" place of the decimal number are given the reference numerals 540 to 549 inclusive. In the center of the figure lamps displaying in order the same figures for the "tens" place of the decimal number are given the reference numerals 550 to 559 inclusive. At the left of the figure lamps displaying in order the figures 0 to 9 for the "hundreds" place of the decimal number are given the reference numerals 560 to 569 inclusive: since four binary places are capable of representing sixteen different numbers, and since the subsequent decimalization will not be interfered with, further lamps 570, 571, 572, 573, 574, and 575 are provided to display 10, 11, 12, 13, 14, and 15 "hundreds."

Each of relays 520, 521, etc. has a plurality of movable contacts. In Figure 14 these contacts are all shown in the normal or deenergized condition of the relays. For economy of relay contacts, the "tree" type of interconnection has been used: relay operation compared with signal input may be tabulated as follows.

| Relay No. | Decimal Nos. for which Relay is Energized |
|---|---|
| 520 | 800, 900, 1000, 1100, 1200, 1300, 1400, 1500. |
| 521 | 400, 500, 600, 700, 800, 900, 1000, 1100. |
| 522 | 200, 300, 400, 500, 1000, 1100, 1200, 1300. |
| 523 | 100, 200, 500, 600, 900, 1000, 1300, 1400. |
| 524 | See text below. |
| 525 | 10, 20, 30, 40, 50, 60, 70, 80. |
| 526 | 00, 10, 20, 70, 80, 90. |
| 527 | 20. 30, 60, 70. |
| 530 | See text below. |
| 531 | 1, 2, 3, 4, 5, 6, 7, 8. |
| 532 | 0, 1, 2, 7, 8, 9. |
| 533 | 2, 3, 6, 7. |

Relay 524 is normal for numbers 00, 10, 20, 30, and 40 if the preceding decimal digit is even and for numbers 50, 60, 70, 80, and 90 if the preceding decimal digit is odd: it is operated for numbers 00, 10, 20, 30, and 40 preceded by an odd decimal digit and for numbers 50, 60, 70, 80, and 90 preceded by an even decimal digit. Similarly relay 530 is normal for numbers 0, 1, 2, 3, and 4 if the sum of the preceding progressive decimal digits is even and for numbers 5, 6, 7, 8, and 9 if the sum of the preceding progressive decimal digits is odd, and is operated for numbers 1, 2, 3, and 4 preceded by an odd sum of progressive decimal digits and for numbers 5, 6, 7, 8, and 9 if the sum of the preceding progressive decimal digits is even.

From the above table and the circuit diagram it will be apparent that the signal value 0 is not represented by deenergization of all relays. This has also been provided purposely, for economy of relay contacts, and is accomplished by changing certain standard voltages. It was earlier pointed out that to get binary representation of the digits of a decimal number, standard values in the ratio of 1, 1/2, 1/4, 1/8, 1/10, 1/20, 1/40, 1/80, 1/100, 1/200, etc. are required. The desired zero signal relay condition for Figure 14 is established by changing 1/10 and 1/100 in the above series to 1/16 and 1/160, respectively, all other values remaining the same.

To obtain the desired output from a twelve stage quantizer according to Figure 4, with the desired modifications to give three digit representation and a selected zero relay condition, requires that the summing resistors connected to conductor 244 have the values R, 2R, 4R, 8R, 16R, 20R, 40R, 80R, 160R, 200R, 400R, and 800R. The gains of the fixed gain units are accordingly adjusted to values of 2, 3/2, 5/4, 9/8, 17/16, 21/20, 41/40, 81/80, 161/160, 201/200, and 401/400.

The following tabulation shows the sequence of relay operation as the signal varies from 0 to 10 units and at selected values throughout the range of the signal.

*Table II.—Relays operated*

| Number Represented | 520 | 521 | 522 | 523 | 524 | 525 | 526 | 527 | 530 | 531 | 532 | 533 |
|---|---|---|---|---|---|---|---|---|---|---|---|---|
| 0 | ---- | ---- | ---- | ---- | ---- | ---- | x | ---- | ---- | ---- | x | ---- |
| 1 | ---- | ---- | ---- | ---- | ---- | ---- | x | ---- | ---- | x | x | ---- |
| 2 | ---- | ---- | ---- | ---- | ---- | ---- | x | ---- | ---- | x | x | x |
| 3 | ---- | ---- | ---- | ---- | ---- | ---- | x | ---- | ---- | x | ---- | x |
| 4 | ---- | ---- | ---- | ---- | ---- | ---- | x | ---- | ---- | x | ---- | ---- |
| 5 | ---- | ---- | ---- | ---- | ---- | ---- | x | ---- | x | x | ---- | ---- |
| 6 | ---- | ---- | ---- | ---- | ---- | ---- | x | ---- | x | x | ---- | x |
| 7 | ---- | ---- | ---- | ---- | ---- | ---- | x | ---- | x | x | x | x |
| 8 | ---- | ---- | ---- | ---- | ---- | ---- | x | ---- | x | x | x | ---- |
| 9 | ---- | ---- | ---- | ---- | ---- | ---- | x | ---- | x | ---- | x | ---- |
| 10 | ---- | ---- | ---- | ---- | ---- | x | x | ---- | x | ---- | x | ---- |
| 14 | ---- | ---- | ---- | ---- | ---- | x | x | ---- | x | x | ---- | ---- |
| 15 | ---- | ---- | ---- | ---- | ---- | x | x | ---- | ---- | x | ---- | ---- |
| 19 | ---- | ---- | ---- | ---- | ---- | x | x | ---- | ---- | ---- | x | ---- |
| 20 | ---- | ---- | ---- | ---- | ---- | x | x | x | ---- | ---- | x | ---- |
| 21 | ---- | ---- | ---- | ---- | ---- | x | x | x | ---- | x | x | ---- |
| 24 | ---- | ---- | ---- | ---- | ---- | x | x | x | ---- | x | ---- | ---- |
| 25 | ---- | ---- | ---- | ---- | ---- | x | x | x | x | x | ---- | ---- |
| 49 | ---- | ---- | ---- | ---- | ---- | x | ---- | ---- | x | ---- | x | ---- |
| 50 | ---- | ---- | ---- | ---- | x | x | ---- | ---- | x | ---- | x | ---- |
| 99 | ---- | ---- | ---- | ---- | x | ---- | x | ---- | ---- | ---- | x | ---- |
| 100 | ---- | ---- | ---- | x | x | ---- | x | ---- | ---- | ---- | x | ---- |
| 199 | ---- | ---- | ---- | x | ---- | ---- | x | ---- | ---- | ---- | x | ---- |
| 200 | ---- | ---- | x | x | ---- | ---- | x | ---- | ---- | ---- | x | ---- |
| 399 | ---- | ---- | x | ---- | ---- | ---- | x | ---- | ---- | ---- | x | ---- |
| 400 | ---- | x | x | ---- | ---- | ---- | x | ---- | ---- | ---- | x | ---- |
| 799 | ---- | x | ---- | ---- | ---- | ---- | x | ---- | ---- | ---- | x | ---- |
| 800 | x | x | ---- | ---- | ---- | ---- | x | ---- | ---- | ---- | x | ---- |
| 1599 | x | ---- | ---- | ---- | ---- | ---- | x | ---- | ---- | ---- | x | ---- |

While the arrangement shown in Figure 14 is constructed specifically for use with relays actuated according to progressive binary coded progressive decimal numbers, it will be evident that an analogous structure could be set up for relays actuated according to the numbers in simple binary system or in other systems: my invention is sufficiently comprehensive to embrace this modification also.

From the foregoing it will be evident that I have devised a number of analogue to digital converters having as common inventive concept the use of nonlinear devices arranged in cascade. As general classes of such devices I have illustrated switching, exponential arrangements, and rectifiers. I have also arranged my apparatus for the use of a convenient progressive binary code instead of the simple binary system, and for giving a decimal output for visual use in supervising the quantity, a specific feature being the arrangement whereby a plurality of each of the figures in a decimal number having a plurality of decimal places.

Numerous objects and advantages of my invention have been set forth in the foregoing description, together with details of structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Means for converting to digital response a signal voltage which is continuously variable throughout a selected range comprising, in combination: power means supplying standard voltages having selected relative magnitudes; a plurality of quantizer stages each comprising rectifier means for giving an output which passes twice through a range of values while the input thereto passes once through a range of values, and a cathode follower energized with the output of said rectifier means; means interconnecting said stages and said power means so that the signal voltage and a standard voltage comprise the inputs to the first stage, and the inputs to each succeeding stage comprise the output of a preceding cathode follower and one of said standard voltages; and output means connected to said rectifier means.

2. In combination: a source of signal voltage; power means supplying standard voltages having selected relative amplitudes; a plurality of rectifier bridges; and means interconnecting said source, said bridges, and said power means so that the signal voltage and a standard voltage comprise the input to a first of said bridges and the input to each succeeding bridge includes the output of a preceding bridge and one of said standard voltages.

3. Means for converting to digital response a signal voltage which is continuously variable throughout a selected range comprising, in combination: power means supplying standard voltages having selected relative magnitudes; a plurality of quantizer stages each comprising rectifier means for giving an output which passes twice through a range of values while the input thereto passes once through a range of values; and means interconnecting said stages and said power means so that the signal voltage and a standard voltage comprise the inputs to the first stage and the inputs to each succeeding stage comprise the output of a preceding stage and one of said standard voltages.

4. Means for converting to digital response a signal voltage which is continuously variable throughout a selected range comprising, in combination: power means supplying standard voltages having magnitudes related as successive negative powers of two, the largest of said voltages being equal in magnitude to the mid value of said range; a plurality of quantizer stages each comprising rectifier means for giving an output which passes twice through a range of values while the input thereto passes once through a range of values; and means interconnecting said stages and said power means so that the signal voltage and said largest standard voltage comprise the input to the first stage, and the inputs to each succeeding stage comprise the output of a preceding stage and successive smaller ones of said standard voltages.

(References on following page)

References Cited in the file of this patent

UNITED STATES PATENTS

| | | |
|---|---|---|
| 2,318,591 | Couffignal | May 11, 1943 |
| 2,364,540 | Luhn | Dec. 5, 1944 |
| 2,453,454 | Norwin | Nov. 9, 1948 |
| 2,556,200 | Lesti | June 12, 1951 |
| 2,612,550 | Jacobi | Sept. 30, 1952 |
| 2,630,481 | Johnson | Mar. 3, 1953 |
| 2,630,562 | Johnson | Mar. 3, 1953 |
| 2,641,522 | King | June 9, 1953 |
| 2,656,106 | Stabler | Oct. 20, 1953 |
| 2,660,618 | Aigrain | Nov. 24, 1953 |
| 2,679,644 | Lippel | May 25, 1954 |
| 2,715,724 | Oberman et al. | Aug. 16, 1955 |
| 2,733,432 | Breckman | Jan. 31, 1956 |
| 2,755,459 | Carbrey | July 17, 1956 |

OTHER REFERENCES

Trans. of the IRE Prof. Group on Instrumentation, June 1953, The SADIC, a precision-Analog-Digital Converter by Sink et al. (pages 48–54).

Proc. of IRE, October 1953, "A Survey of Analog-to-Digital Converters," by Burke, pages 1455–1465.

Electronics, "Step Switch Converter Digitizes Analog Data," by Bennet et al., pages 164, 165, Nov. 1, 1953.